(12) United States Patent
Oku et al.

(10) Patent No.: US 7,664,052 B2
(45) Date of Patent: Feb. 16, 2010

(54) RING NETWORK AND MASTER NODE

(75) Inventors: Tomoyuki Oku, Kokubunji (JP);
Shinichi Akahane, Hachioji (JP)

(73) Assignee: Alaxala Networks Corporation, Kanagawa (JP)

( * ) Notice: Subject to any disclaimer, the term of this patent is extended or adjusted under 35 U.S.C. 154(b) by 535 days.

(21) Appl. No.: 11/703,073

(22) Filed: Feb. 7, 2007

(65) Prior Publication Data
US 2007/0204068 A1    Aug. 30, 2007

(30) Foreign Application Priority Data
Feb. 24, 2006  (JP) .............................. 2006-048855
Jul. 27, 2006  (JP) .............................. 2006-204931

(51) Int. Cl.
H04L 12/26 (2006.01)
H04J 1/16 (2006.01)
G08C 15/00 (2006.01)
G06F 11/00 (2006.01)
G01R 31/08 (2006.01)

(52) U.S. Cl. ........................ 370/254; 370/216; 370/235; 370/248; 709/235; 709/238; 714/48

(58) Field of Classification Search ......... 370/216–235, 370/254–299, 401–419; 709/224–238, 250–254; 714/48–56
See application file for complete search history.

(56) References Cited

U.S. PATENT DOCUMENTS 5,781,534 A * 7/1998 Perlman et al. ............. 370/248
6,052,733 A * 4/2000 Mahalingam et al. ....... 709/235
6,134,678 A * 10/2000 Mahalingam et al. ......... 714/48
6,208,616 B1 * 3/2001 Mahalingam et al. ....... 370/216
6,952,421 B1 * 10/2005 Slater ......................... 370/401
2006/0239201 A1 * 10/2006 Metzger et al. ............. 370/252
2008/0304413 A1 * 12/2008 Briscoe et al. .............. 370/235

FOREIGN PATENT DOCUMENTS

JP  2003-234747  8/2003
JP  2004-248316  9/2004

OTHER PUBLICATIONS

RFC3619, Extreme Network' Ethernet Automatic Protection Switching (EAPS) Version 1, Oct. 2003.

* cited by examiner

Primary Examiner—M. Phan
(74) Attorney, Agent, or Firm—Mattingly & Malur, P.C.

(57) ABSTRACT

A master node transmits a probe packet for checking a condition of a network in a ring in both directions thereof to detect the occurrence of a fault on the ring. A slave node increments a hop count included in the received probe packet, transmits it to an adjacent node configuring the ring, and transmits a hop count report packet to the master node. The master node detects a fault on the ring based upon a fact that the master node does not receive the probe packet transmitted by itself. Further, the master node detects the occurrence of multiple faults and the recovery of at least one of the multiple faults based upon the sum of maximum values of hop counts in the hop count report packets received from both directions of the ring and transmits a packet for prompting the update of the database for packet transfer.

14 Claims, 17 Drawing Sheets

RING NETWORK AND MASTER NODE

CLAIM OF PRIORITY

The present application claims priority from Japanese applications JP 2006-048855 filed on Feb. 24, 2006 and JP 2006-204931 filed on Jul. 27, 2006, the contents of which are hereby incorporated by reference into this application.

FIELD OF THE INVENTION

The present invention relates to a ring network and a master node, particularly relates to a ring network and a master node that can detect the occurrence of multiple faults and the recovery of one or more of the multiple faults in the network having master-slave relationship on the ring.

BACKGROUND OF THE INVENTION

To enhance the reliability of a network, a ring protocol has been proposed. The ring protocol includes a method of keeping nodes configuring a ring in master-slave relationship (for example, refer to RFC3619, Extreme Networks' Ethernet Automatic Protection Switching (EAPS) Version 1, October 2003 (Non-patent Document)). In this method, a master node has a right to control the ring. The master node issues a health check packet via a first port connected to the ring every fixed time so as to check a ring condition. In addition, the master node logically blocks a second port connected to the ring so as to prevent a data packet from entering a loop on the ring. However, the second port does not logically block a control packet including a health check packet. The master node recognizes that a fault occurs on the ring when the master node cannot receive a health check packet via the second port every fixed time.

When a fault occurs on the ring, the master node releases a logical block for the second port. The master node updates a database for data packet transfer in itself immediately after the release. Simultaneously, the master node issues a message for prompting all slave nodes configuring the ring to update a database for transfer. A data packet is transmitted without passing a faulty location on the ring by the update of the database for transfer. The master node also continues to issue a health check packet via the first port while the fault occurs. The master node recognizes that the fault recovers on the ring when the health check packet can be received via the second port. At this time, the master node logically blocks the second port and updates the database for transfer in itself. Simultaneously, the master node issues a message for prompting all slave nodes to update each database for transfer to all the slave nodes configuring the ring. That is, a data packet input to the ring is transmitted on the same line as that before the fault occurs.

In addition, a method that each node configuring a ring and connected via a two-way line issues a health check including packet remaining time in two directions of the ring and updates relation between the node and another node based upon a situation in which a health check issued from another node reaches is disclosed (for example, refer to JP-A No. 234747/2003).

In addition, a method is disclosed that when a node that receives a pilot packet issued from a master node of a ring connected by an optical fiber notifies the master node of whether the node can normally receive the pilot packet or not, the master node identifies a faulty node on the ring (for example, refer to JP-A No. 248316/2004).

In JP-A No. 234747/2003, a relation between a node and a sender node is acquired based upon the remaining time of a packet issued from another node. However, the handling of multiple faults on the ring is not disclosed. In JP-A No. 248316/2004, the master node only checks a condition of another node on the ring and the handling of multiple faults on the ring is not disclosed.

In Non-patent Document, the handling of multiple faults on the ring is not described. Even if multiple faults occur, it is conceivable that a master node in Non-patent Document prompts all nodes configuring the ring to update a database for transfer only when a first fault on the ring occurs and only when the master node recognizes that all faults on the ring recover. Therefore, it is conceivable that when one fault recovers after multiple faults occur on the ring, the master node in Non-patent Document does not prompt all nodes configuring the ring to update each database for transfer. That is, in recovery from multiple faults, it can be estimated that the reliability of data transmission is deteriorated.

Besides, in Non-patent Document, the handling of a fault in the master node on the ring is also not described. Therefore, it is conceivable that a slave node in Non-patent Document cannot prompt the master node to update a database for transfer. Consequently, when a fault occurs in the master node on the ring, the reliability of the network may be deteriorated.

SUMMARY OF THE INVENTION

The invention is made in view of the above-mentioned problem and the object is to prompt each node with which a ring is provided to update a database for transfer after detection when a master node detects the occurrence of at least one fault and multiple faults on the ring in a network keeping nodes with which the ring is provided in master-slave relationship. Further, the object of the invention is to prompt each node with which the ring is provided to update a database for transfer after detection when the master node detects the recovery of at least one of multiple faults on the ring in the network keeping nodes with which the ring is provided in a master-slave relationship. Further, the object of the invention is to enhance the reliability of a communication network by suitably updating a database for transfer of a node configuring the ring independent of whether a fault occurs in the master node on the ring or not. One object of the invention is to enable one of slave nodes that cannot receive a probe packet from the master node to operate as a master node.

Another object of the invention is to also suitably update a database for transfer of a node configuring the ring when locations where multiple faults occur change in the ring network.

According to a first aspect of the invention, a ring network including plural nodes that transfer a packet referring to a database for packet transfer and having the following characteristics is provided. The plural nodes are connected in a ring, at least one of the nodes is a master node that transmits a probe packet for checking a condition of the network where the plurality of nodes are connected in the ring, and the other nodes are slave nodes that process according to an instruction from the master node. The master node transmits one or a predetermined number of probe packets of which each hop count is initialized in both directions of the ring via a first port and a second port every predetermined time or irregularly. Each of the slave nodes increments a hop count included in the probe packet when each of the slave nodes receives the probe packet via one of the two ports connected to the ring, each of the slave nodes transmits the probe packet including the incremented hop count to the adjacent slave node or the master node via the other port different from the port via which the probe packet is received, each of the slave nodes generates a hop count report packet including the incremented hop count and transmits it to the master node via the port via which the probe packet is received. The master node receives one or more hop count report packets transmitted from each of the slave nodes via the first port and the second port, manages a maximum value of hop counts included in the hop count report packets for every port, calculates the sum of a maximum value of hop counts corresponding to the first port and a maximum value of hop counts corresponding to the second port, acquires the total number of slave nodes communicable with the master node based upon the calculated sum, detects the occurrence of multiple faults on the ring and the recovery of at least one of the multiple faults based upon the variation of the acquired total number of communicable slave nodes, further detects a change of topology on the ring based upon the variation of a maximum value of hop counts corresponding to the first port or the second port when the acquired total number of communicable slave nodes is unchanged, updates the database in itself every time these events are detected, and/or transmits a packet for updating the database for packet transfer to the slave node.

According to a second aspect of the invention, a ring network including plural nodes that transfer a packet referring to a database for packet transfer and having the following characteristics is provided. The plural nodes are connected in a ring, at least one of the nodes is a master node that transmits a probe packet for checking a condition of the network where the plurality of nodes are connected in the ring and the other nodes are slave nodes that process according to an instruction from the master node. The master node transmits one or a predetermined number of probe packets of which each hop count is initialized in both directions of the ring via the first port and the second port every predetermined time or irregularly. Each of the slave nodes increments a hop count included in the probe packet when each of the slave nodes receives the probe packet via one of the two ports connected to the ring, transmits the probe packet including the incremented hop count to the adjacent slave node or the master node via the other port different from the port, via which the probe packet is received generates a hop count report packet including the incremented hop count, and transmits it to the master node via the port via which the probe packet is received. The master node receives plural hop count report packets from each of the slave nodes via the first port and the second port, manages a maximum value of hop counts included in the hop count report packets for every port, calculates the sum of a maximum value of hop counts corresponding to the first port and a maximum value of hop counts corresponding to the second port, acquires the total number of slave nodes communicable with the master node based upon the calculated sum, detects the occurrence of multiple faults on the ring and the recovery of at least one of the multiple faults based upon the variation of the acquired total number of communicable slave nodes, updates a database in itself every time these events are detected, and/or transmits a packet for updating the database for packet transfer to the slave node.

According to a third aspect of the invention, there is provided a master node provided with a first port and a second port respectively connected to a ring and a ring manager that detects the occurrence and the recovery of a fault on the ring in a ring network where plural nodes that transfer a packet referring to a database for packet transfer are connected in the ring and having the following characteristics. The ring manager transmits one or a predetermined number of probe packets of which each hop count is initialized in both directions of the ring via the first port and the second port every predetermined time or irregularly. The probe packet is received via one of two ports connected to the ring, a hop count included in the probe packet is incremented, the probe packet included in the incremented hop count is transmitted to an adjacent slave node or the master node via the other port different from the packet received port, a hop count report packet including the incremented hop count is generated, and the hop count report packet is transmitted to the master node via the port via which the probe packet is received. The ring manager receives the plural hop count report packets including the incremented hop counts acquired by incrementing a hop count included in the probe packet and transmitted by the other nodes configuring the ring via the first port and the second port, and manages a maximum value of hop counts included in the hop count report packets for every port. Besides, the ring manager calculates the sum of a maximum value of hop counts corresponding to the first port and a maximum value of hop counts corresponding to the second port, acquires the total number of communicable slave nodes based upon the calculated sum, detects the occurrence of multiple faults on the ring and the recovery of at least one of the multiple faults based upon the variation of the acquired total number of communicable slave nodes, updates the database in the master node every time these events are detected, and/or transmits a packet for updating the database for packet transfer to the other nodes configuring the ring.

According to the invention, in the network keeping nodes with which the ring is provided in master-slave relationship, the master node can prompt each node with which the ring is provided to update each database for transfer after detection when the master node detects the occurrence of at least one fault on the ring. Further, according to the invention, in the network keeping nodes with which the ring is provided in master-slave relationship, the master node can prompt ring configuration nodes to update their databases for transfer immediately after detection when the master node detects the recovery of at least one fault while multiple faults occur on the ring. Further, according to the invention, the network keeping the reliability of communication can be provided by suitably updating their databases for transfer of ring configuration nodes independent of whether a fault occurs in the master node on the ring or not. Furthermore, according to the invention, one of slave nodes that cannot receive a probe packet from the master node can operate as a master node.

In addition, according to the invention, when locations where multiple faults occur change in the ring network, databases for transfer of the ring configuration nodes can also be suitably updated.

DETAILED DESCRIPTION OF THE PREFERRED EMBODIMENTS

First Embodiment

Figure 1:
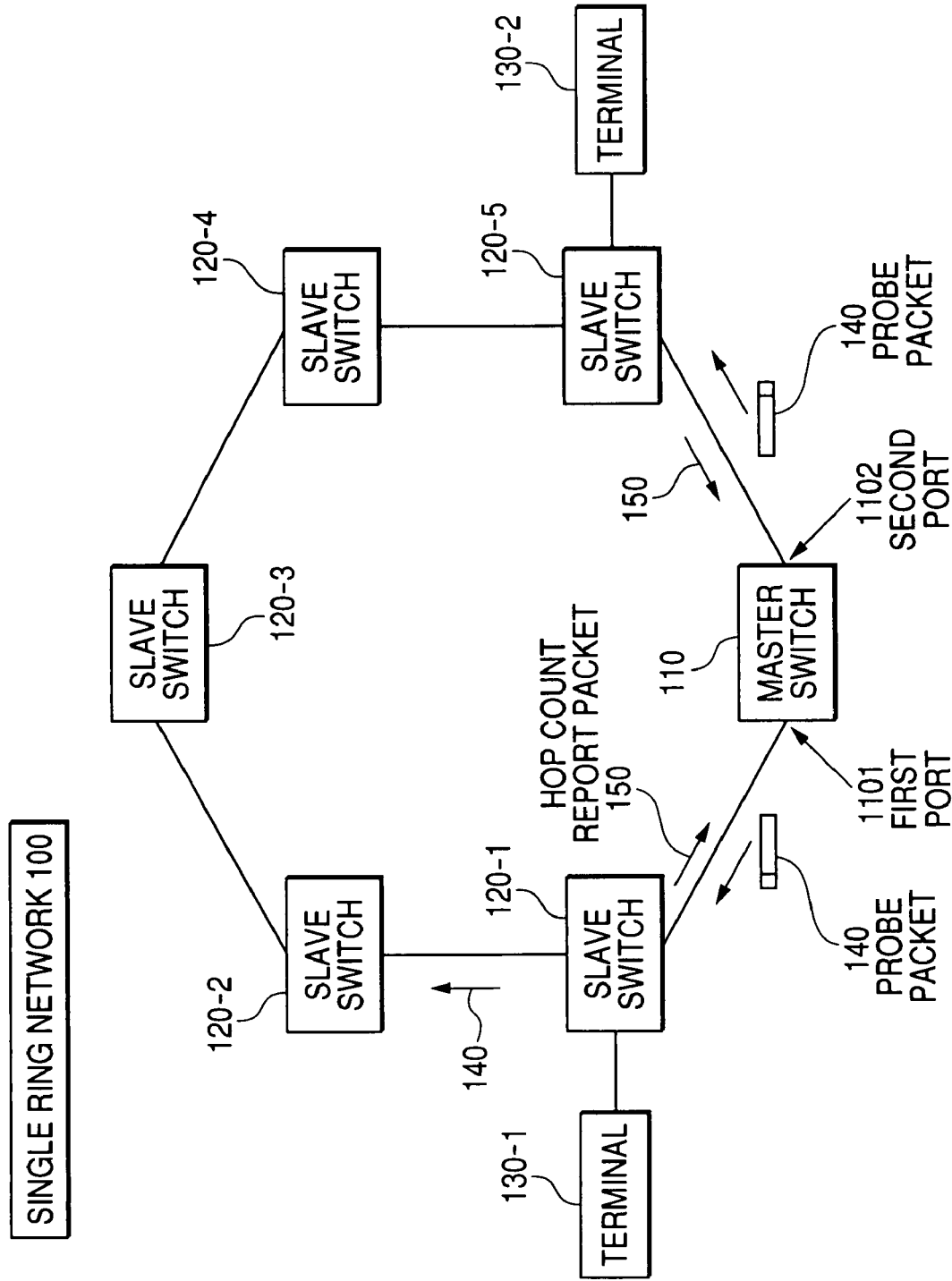
FIG. 1 is a block diagram showing a single ring network 100.

Referring to the drawings, this embodiment will be described below. In this embodiment, a single ring network will be described. However, applied devices and types of packets are not limited.

(Hardware Configuration)

FIG. 1 shows an example of the configuration of the ring network.

The single ring network 100 is provided with a master node (a master switch) 110 that checks a condition of a ring and updates a database for transfer including data packets and slave nodes (slave switches) 120-1 to 120-5 that obey a directive from the master node 110. Terminals 130-1, 1302 are connected to each switch for example.

The master node 110 counts the number of slave nodes that can communicate with the master node 110 to detect the occurrence of multiple faults on the ring and recovery from multiple faults when no fault occurs in itself. The master node 110 transmits a probe packet 140 from a first port 1101 and a second port 1102 to count the number of communicable slave nodes. An item showing the number of slave nodes that can communicate with the master node 110 (hereinafter called a hop count) is included in the probe packet 140.

Each of the slave nodes 120 increments the hop count by one for example immediately after the probe packet 140 is received. Afterward, the slave node transfers the probe packet 140 to an adjacent node configuring the ring which is not on the receiving side). The slave node 120 generates a hop count report packet 150 after incrementing the hop count in the probe packet 140 and transmits it to the master node 110. The hop count report packet 150 is used for transmitting a transport factor of the probe packet 140 to the master node 110.

The master node 110 recognizes the occurrence of a fault on the ring when the probe packet 140 transmitted by itself does not return in fixed time via the ring. At this time, the master node 110 calculates the sum of the maximum value of hop counts receivable via the first port 1101 and the maximum value of hop counts receivable via the second port 1102 in the hop count report packet 150 transmitted by each slave node 120. The master node 110 can detect the occurrence of multiple faults and recovery from multiple faults when they occur on the ring based upon the increase/decrease of the sum of the maximum values of hop counts receivable via the first port 1101 and via the second port 1102.

Figure 2:
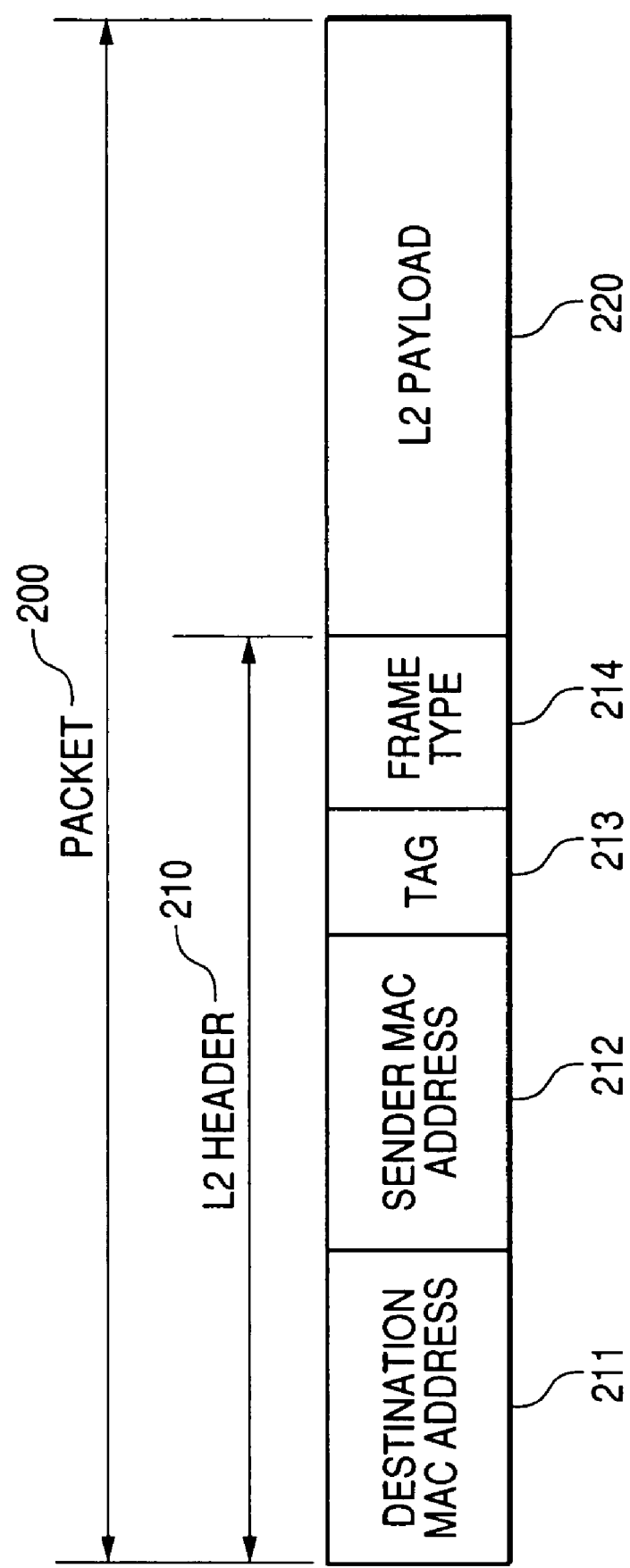
FIG. 2 is an explanatory drawing showing an example of a format of a variable-length packet transmitted on the single ring network 100.

FIG. 2 is an explanatory drawing showing an example of a format of a packet transmitted via the single ring network 100.

A variable-length packet 200 includes an L2 header 210 and an L2 payload 220 on a second layer (a data link layer) in an OSI reference model. The configuration of the L2 header 210 is different depending upon a type of a line accommodated in a device configuring a network. For example, when an accommodated line is Ethernet (a trademark), a destination MAC address 211, a sender MAC address 212, a tag 213 and a frame type 214 are included in the L2 header 210.

Figure 7:
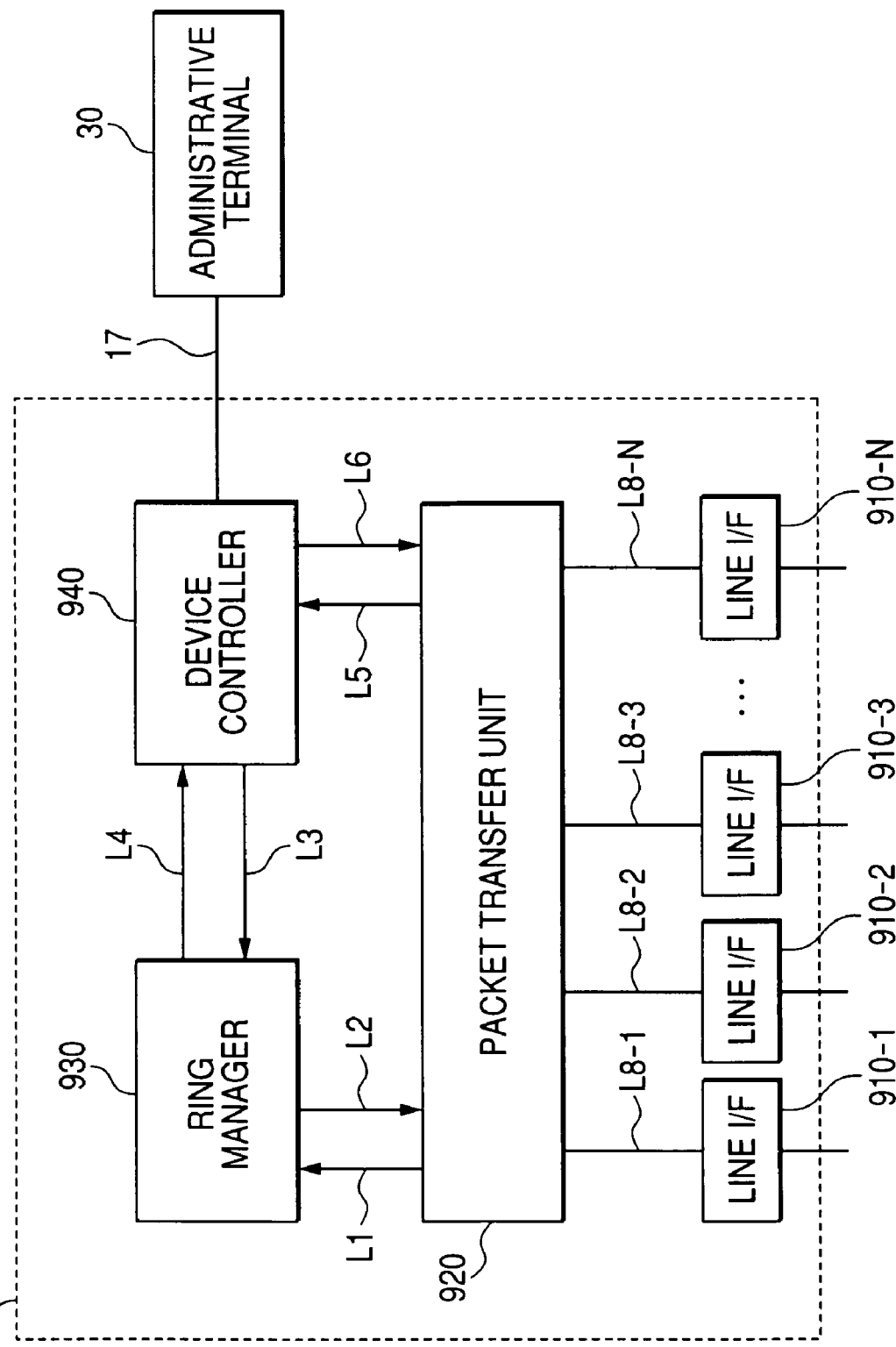
FIG. 7 is a block diagram showing a node appliance 900 with which the ring is provided.

FIG. 7 shows a configuration example of a node appliance 900 with which the ring is provided.

The master node 110 and the slave nodes 120-1 to 120-5 can use the node appliance 900. Either function of both nodes is defined by determining which of the master node 110 or the slave node 120 a device is beforehand.

The node appliance 900 is provided with plural line interfaces 910-*i* (i=1 to N), a packet transfer unit 920, a ring manager 930 and a device controller 940.

Figure 10:
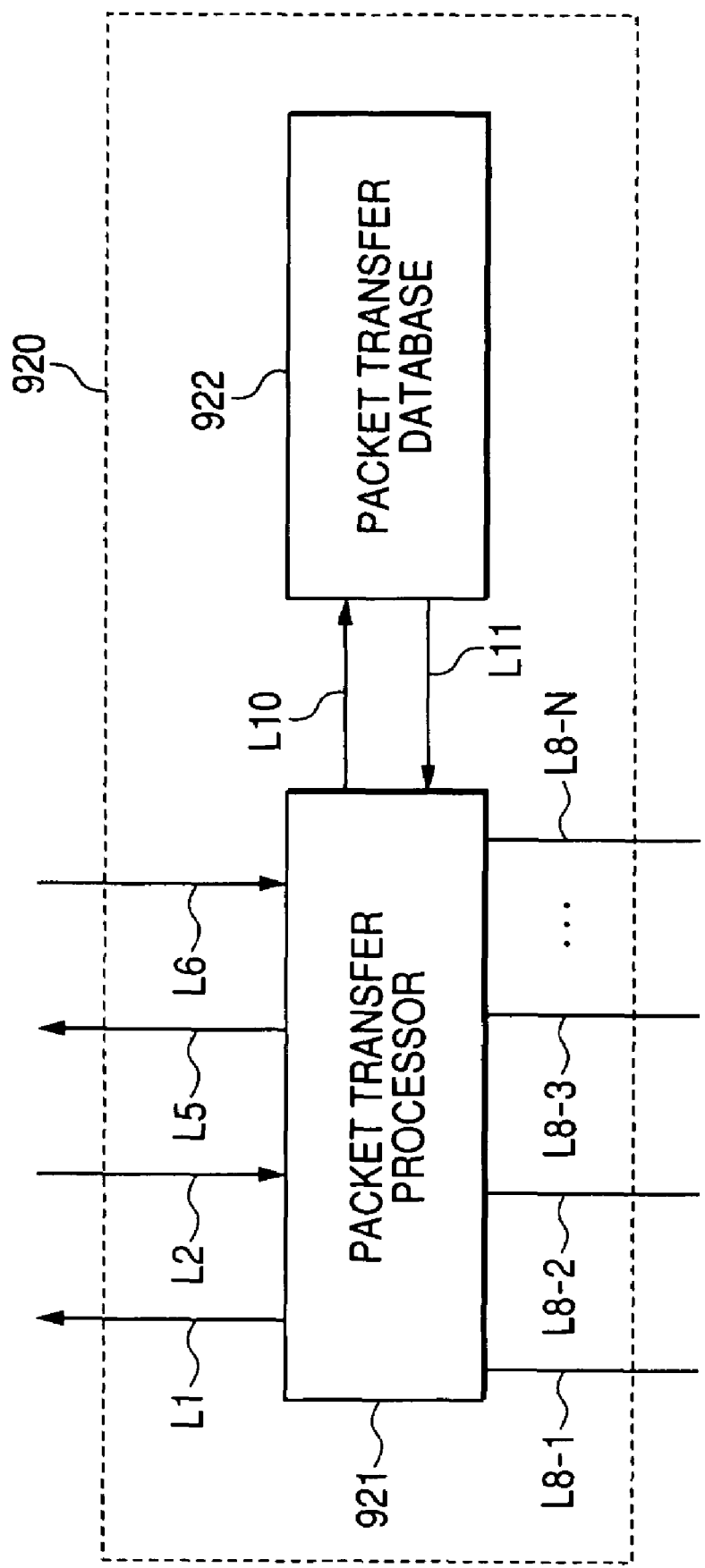
FIG. 10 is a block diagram showing a packet transfer unit 920.

FIG. 10 shows a configuration example of the packet transfer unit 920.

The packet transfer unit 920 is provided with a packet transfer database 922 telling postprocessing to be applied to a received packet and a packet transfer processor 921 that executes a packet transfer process and the control of the packet transfer database 922.

The packet transfer unit 920 determines postprocessing of a received packet. For postprocessing applied to the received packet by the packet transfer unit 920, the retrieval of a sending line interface, transfer to the ring manager 930 that controls the packet according to a ring protocol and transfer to the device controller 940 for example can be given.

Figure 9:
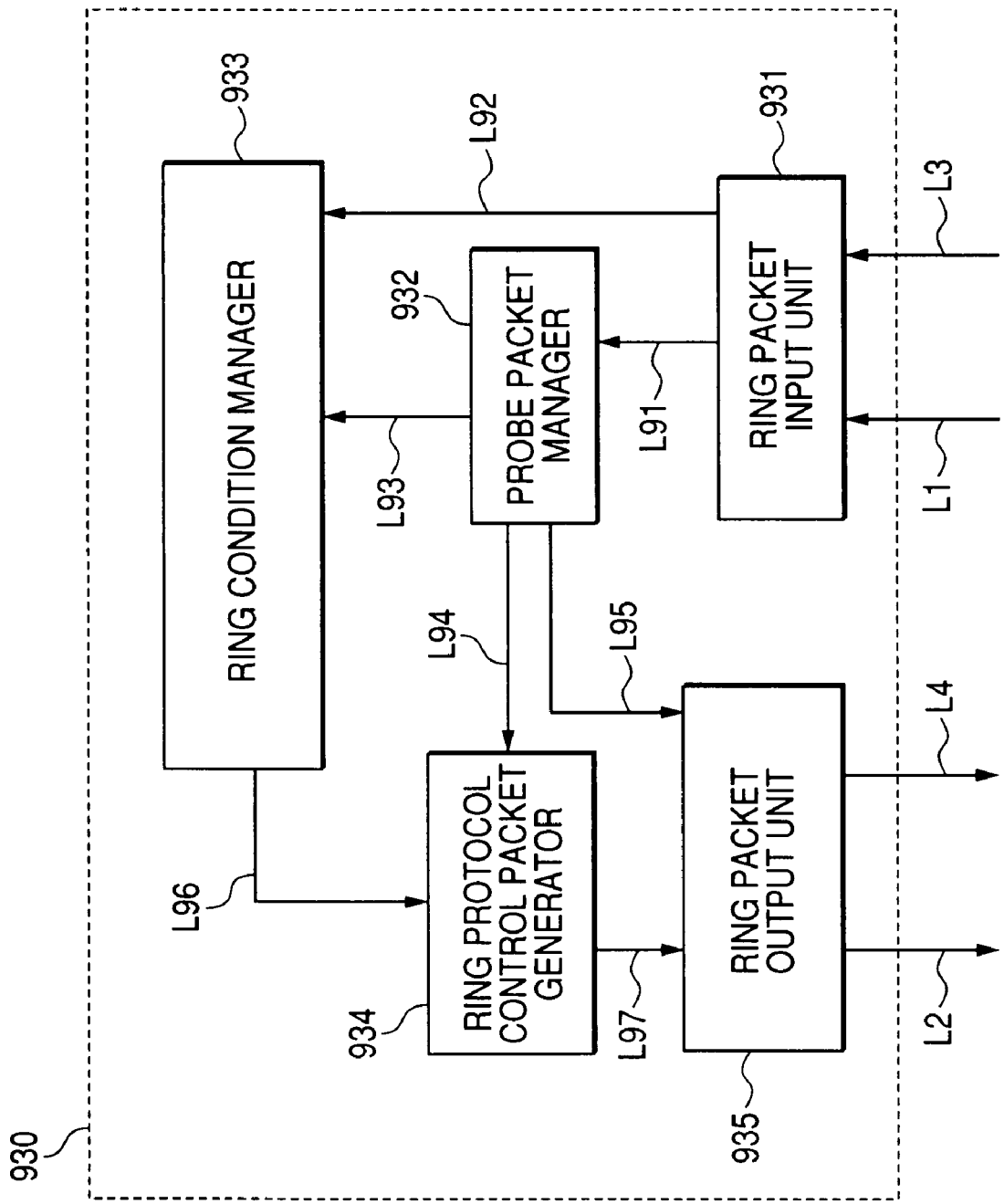
FIG. 9 is a block diagram showing a ring manager 930.

FIG. 9 shows a configuration example of the ring manager 930.

The ring manager 930 is provided with a ring packet input unit 931, a probe packet manager 932, a ring condition manager 933, a ring protocol control packet generator 934 and a ring packet output unit 935. The details of each unit will be described later.

As shown in FIG. 7, the device controller 940 connected to an administrative terminal 30 executes the analysis of a control packet transmitted in the network and control over the whole processor including the packet transfer unit 920. The device controller 940 also executes the update of a condition in the processor or a response to the received control packet using the result of the analysis.

The line interfaces 910-*i* transmit or receive packets transmitted on accommodated lines.

(Mode Setting)

The node appliance 900 with which the ring is provided determines each mode of "master" and "slave" for keeping devices in the relationship of "master" and "slave" in mode setting when the node appliance 900 is activated. In the mode setting of each node with which the ring is provided, a network manager inputs using the administrative terminal 30 per node. The information of a mode input by the network manager is input to the device controller 940 via a signal line L7.

The device controller 940 that receives the mode information generates a packet (a mode information packet) in which the mode information is written to its L2 payload 220 and outputs the generated mode information packet to a signal line L3. The packet input unit 931 that receives the mode information packet from the signal line L3 of the ring manager 930 identifies that the input packet is a mode information packet and outputs it to a signal line L92. The ring condition manager 933 that receives the mode information packet from the signal line L92 sets a mode (a master node, a sub-master node and a slave node) of its own processor based upon information written to the input mode information packet.

(Packet Transfer)

The master node 110 and the slave nodes 120-1 to 120-5 transfer a packet to a destination when they receive the packet 200.

To explain in the concrete, in each node appliance 900, the line interfaces 910-$i$ that receive the packet 200 output the packet 200 received via a signal line L8-$i$ (i=1 to N). The packet transfer processor 921 of the packet transfer unit 920 receives the packet 200 from the signal line L8-$i$ and identifies a type of the packet based upon information written to the received packet 200. At this time, when the received packet 200 is a ring packet, the packet transfer processor outputs the received packet 200 to a signal line L1.

In the meantime, when the received packet 200 is not a ring packet, the packet transfer processor 921 generates a retrieval key for retrieving the packet transfer database 922 from the L2 header 210 and outputs the generated retrieval key and a retrieval command to a signal line L10. As a result of the retrieval, retrieval result information is input to the packet transfer processor 921 via L11. The configuration of the retrieval result information will be described below.

Figure 11:
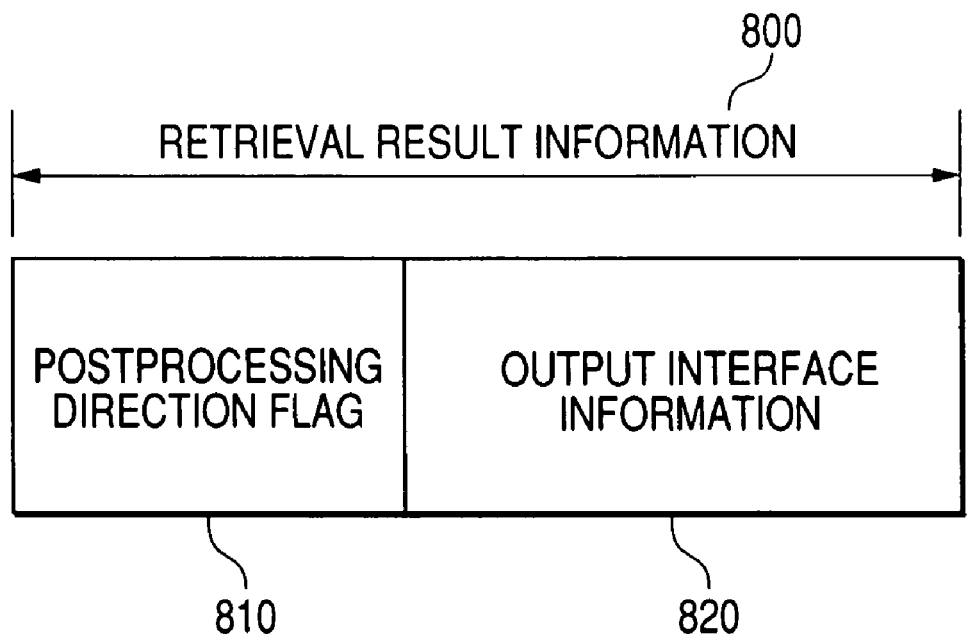
FIG. 11 is an explanatory drawing showing a format of retrieval result information 800 stored in a packet transfer database 922 in transferring the packet.

FIG. 11 is an explanatory drawing showing a format of retrieval result information 800 stored in the packet transfer database 922 when a packet is transferred.

The retrieval result information 800 includes a postprocessing direction flag 810 and output interface information 820.

The packet transfer processor 921 determines postprocessing to be applied to the received packet 200 based upon the postprocessing direction flag 810. In this case, the packet transfer processor 921 outputs the received packet 200 to a signal line L5 when postprocessing told by the postprocessing direction flag 810 is "transfer to the device controller" for example. When the postprocessing is "normal transfer", the packet transfer processor 921 outputs the received packet 200 to a signal line L8-$j$ so as to transmit the received packet 200 via a line interface 910-$j$ (j=1 to N, j≠i) written to the output interface information 820. The packet transfer processor 921 discards the received packet 200 when the postprocessing is "discard".

The operation after a ring protocol is activated of all the node appliances 900 (mode setting is completed) with which the ring is provided will be described below.

The ring protocol is activated after an activating command is input to the administrative terminal 30 of the master node 110 by the network manager is activated. The activating command input by the network manager is input to the device controller 940 via the signal line L7. The device controller 940 to which the activating command is input generates a packet to the L2 payload 220 of which mode information is written (a ring protocol activating packet) and outputs the generated ring protocol activating packet to the signal line L3. The packet input unit 931 to which the packet including the mode information is input from the signal line L3 identifies that the input packet is a ring protocol activating packet and outputs it to the signal line L92. The ring condition manager 933 to which the ring protocol activating packet is put from the signal line L92 outputs it to a signal line L96 and simultaneously or substantially simultaneously activates a ring protocol management timer. At this time, the ring condition manager 933 restores a ring condition to "normal".

Afterward, the master node 110 generates a probe packet 140 for the ring protocol control packet generator 934 to check a ring condition. The probe packet 140 uses a format of the packet 200. In generating the probe packet 140, the ring protocol control packet generator 934 writes a hop count in which the number (a hop count) of slave nodes 120 communicable with the master node 110 is initialized and information for identifying the probe packet 140 to an L2 payload 220. After generating a probe packet 140, the ring protocol control packet generator 934 outputs it to a signal line L97.

The ring packet output unit 935 to which the probe packet 140 is input from the signal line L97 identifies that the input packet is a probe packet 140 and outputs it to a signal line L2.

The packet transfer processor 921 to which the probe packet 140 is input from the signal line L2 identifies that the input packet is a probe packet 140 based upon information written to the L2 payload 220 of the input packet. At this time, the packet transfer processor 921 copies the probe packet 140. The packet transfer processor 921 outputs two probe packets 140 as a result of copying to signal lines L8 corresponding to the first port 1101 and the second port 1102 respectively which are components of the line interface 910. Afterward, each of the probe packets 140 is transmitted via the line interfaces 910 corresponding to the first port 1101 and the second port 1102.

When a ring condition is normal, the probe packet 140 transmitted from the first port 1101 shown in FIG. 1 is transmitted clockwise on the ring toward the second port 1102. The probe packet 140 transmitted from the second port 1102 is transmitted counterclockwise on the ring toward the first port 1101.

The first port 1101 and the second port 1102 can be defined at the same time as mode setting executed by the network manager via the administrative terminal 30. Further, in the mode setting, the number of slave switches with which the ring is provided is defined in the master switch.

Though the following is not described in relation to FIG. 1, the second port 1102 of the master node 110 logically blocks a data packet. For example, when the master node 110 receives a data packet from the terminal 130-2 to the terminal 130-1 via the second port 1102, the master node 110 discards the received data packet. The reason why the data packet is logically blocked is to prevent line congestion from being caused by a situation that the data packet infinitely circulates on the ring. The logical block discards only a data packet and does not discard a packet (a control packet) for controlling the ring including a probe packet 140.

(Flowchart)

Figure 3:
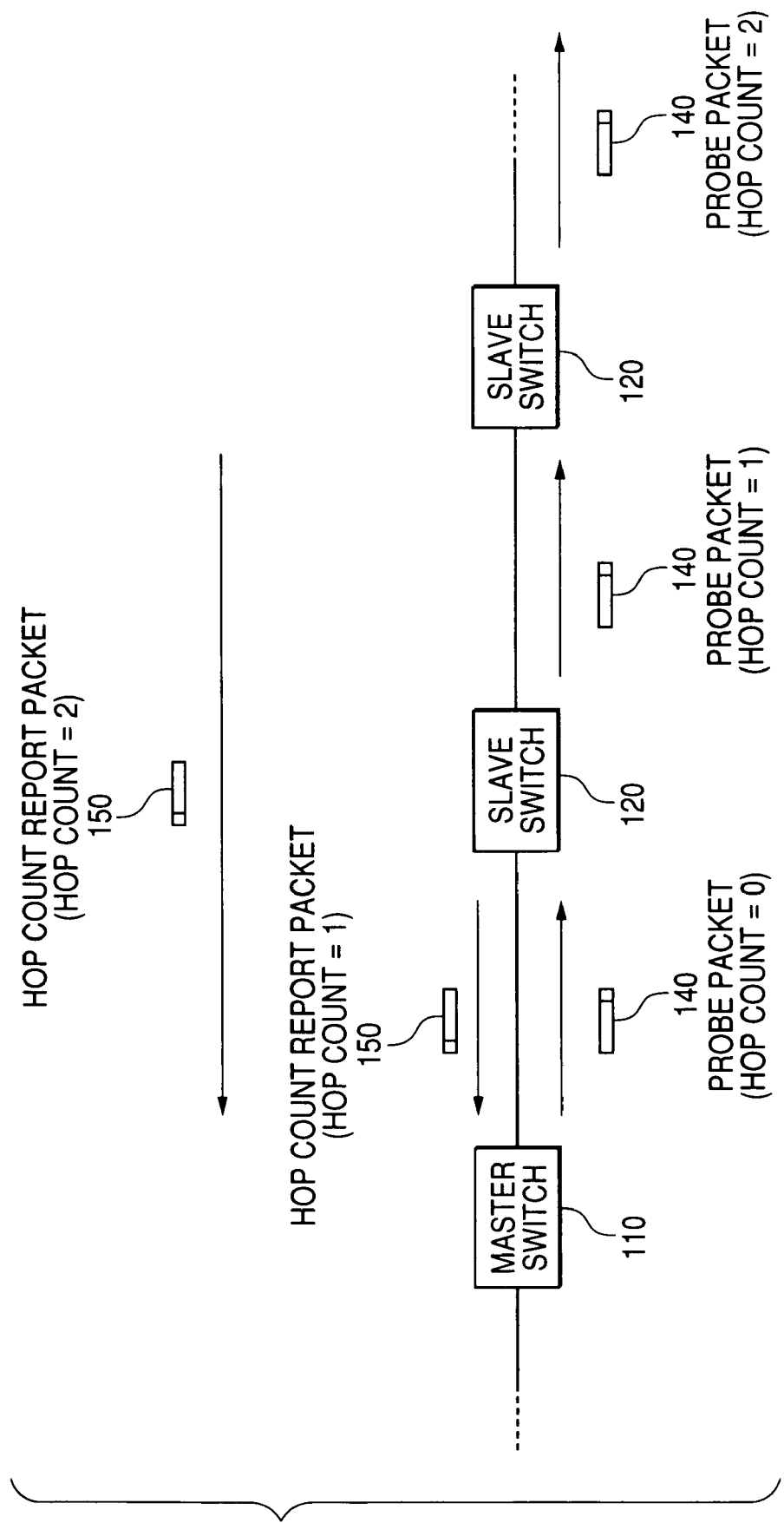
FIG. 3 is an explanatory drawing showing a relation between a probe packet 140 issued by a master node 110 and a hop count report packet 150 issued by a slave node 120.
Figure 4:
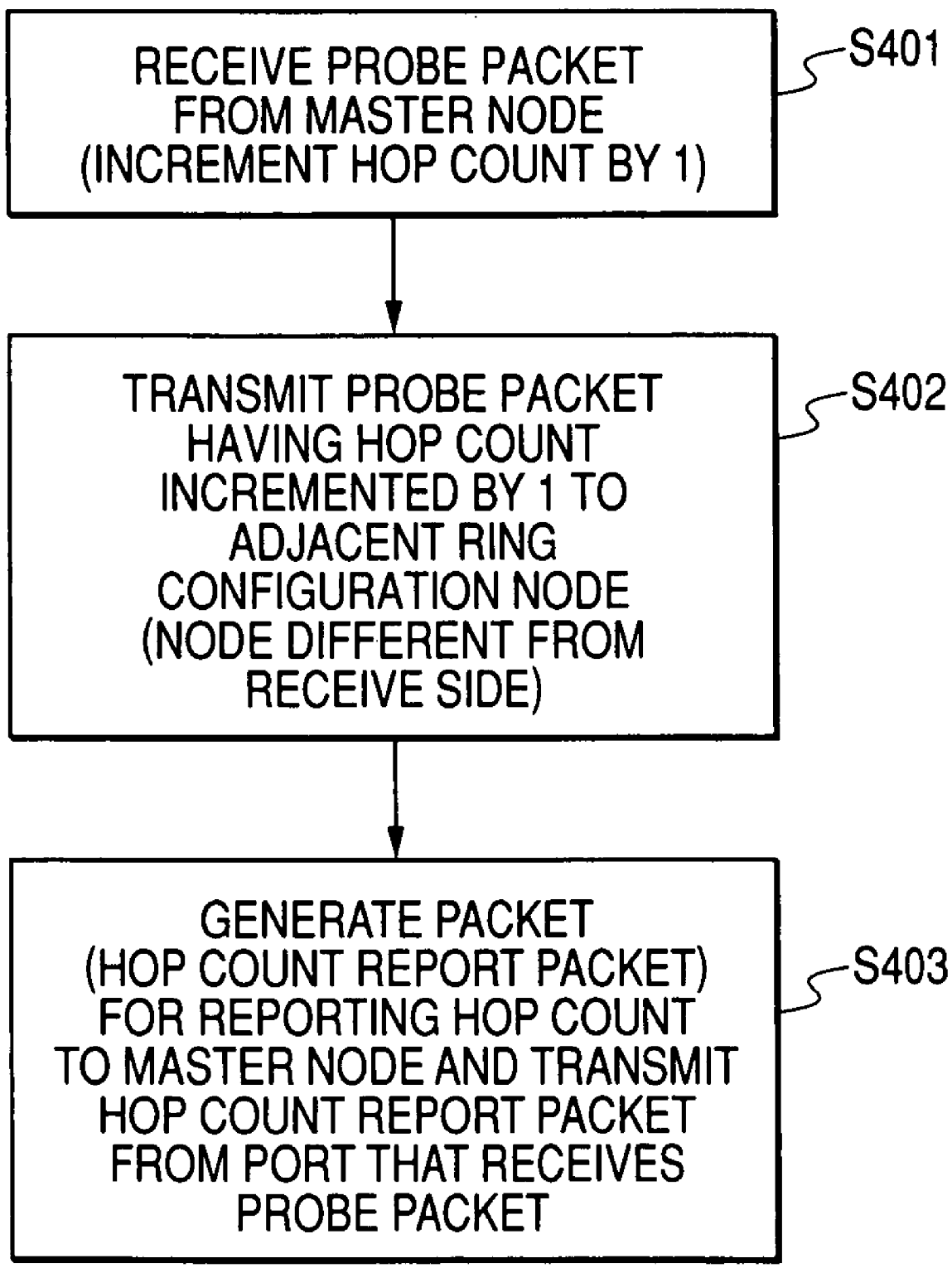
FIG. 4 is a flowchart showing a process for receiving/transmitting the probe packet 140 and issuing the hop count report packet 150 respectively by the slave node 120.

FIG. 3 is an explanatory drawing for explaining relation between a probe packet 140 and a hop count report packet 150. FIG. 4 is a flowchart showing transmitting/receiving a probe packet 140 by the slave node 120 and a process for issuing a hop count report packet 150.

The slave node 120 receives a probe packet 140 and increments a hop count in the probe packet 140 by one (a step S401). The slave node 120 transmits the probe packet 140 the hop count of which is incremented to an adjacent node from a port accommodating a line for the ring on the reverse side to a packet received port after incrementing the hop count in the probe packet 140 (a step S402). In addition, the slave node 120 generates a hop count report packet 150 for transmitting a transport factor of the probe packet 140 to the master node 110 at the same time as or before/after the step S402. The hop count report packet 150 includes the hop count incremented in the step S401. The slave node 120 transmits the generated hop count report packet 150 to the master node 110 via the line interface via which the probe packet 140 is received (a step S403). The master node 110 can grasp the maximum hop count communicable with the master node 110 by receiving the hop count report packet 150.

In-node operation in each step described above will be described below. In the slave node 120, when the line interface 910-$i$ receives a probe packet 140 transmitted from the master node 110, it outputs the probe packet to the signal line L8-$i$. The packet transfer processor 921 to which the probe packet 140 is input from the signal line L8-$i$ identifies that the input packet is a probe packet 140 based upon information written to the input packet. At this time, the packet transfer processor 921 updates receiving line interface information written to the L2 payload 220 in the identified probe packet 140. Afterward, the packet transfer processor 921 outputs the probe packet 140 the receiving line interface information of which is updated to the signal line L1. The ring packet input unit 931 to which the probe packet 140 is input from the signal line L1 identifies that the input packet is a probe packet 140 and outputs it to a signal line L91. In the slave node 120, the probe packet manager 932 to which the probe packet 140 is input from the signal line L91 increments a hop count written to the L2 payload 220 in the input probe packet 140 by one for example. Further, the probe packet manager 932 copies the probe packet 140 the hop count of which is incremented by one. The probe packet manager 932 outputs two probe packets 140 as a result of copying to a signal line L94 and a signal line L95. In the slave node 120, the ring packet output unit 935 to which the probe packet 140 is input from the signal line L95 outputs the input probe packet 140 to the signal line L2 like a ring packet output unit 935 of the master node 110.

In the slave node 120, the packet transfer processor 921 to which the probe packet 140 is input from the signal line L2 transmits the probe packet 140 from a port accommodating a line for the ring different from receiving line interface information written to the L2 payload 220 of the input probe packet 140. That is, the packet transfer processor transmits the probe packet 140 so that the probe packet makes a round on the ring. Therefore, the packet transfer processor 921 outputs the input probe packet 140 to a signal line L8-$m$ (m=1 to N) corresponding to the port accommodating the line for the ring different from the receiving line interface information written to the L2 payload 220 of the input probe packet 140. Afterward, the probe packet 140 is transmitted from a line interface 910-$m$ corresponding to the signal line L8-$m$ via the signal line L8-$m$.

The probe packet 140 also output to the signal line L94 is output to the ring protocol control packet generator 934. In the slave node 120, the ring protocol control packet generator 934 to which the probe packet 140 is input from the signal line L94 generates a hop count report packet 150 for transmitting a transport factor of the probe packet 140 to the master node. The ring protocol control packet generator 934 uses a hop count (an incremented hop count) written to the input probe packet 140 for a hop count to be written to the hop count report packet 150 in generating. The hop count of the probe packet 140, information for identifying the hop count report packet 150 and receiving line interface information in the input probe packet 140 are written to the L2 payload 220. After generation, the ring protocol control packet generator 934 outputs the generated hop count report packet 150 to the signal line L97. In the slave node 120, the ring packet output unit 935 to which the hop count report packet 150 is input from the signal line L97 identifies the input hop count report packet 150 and outputs it to the signal line L2.

The packet transfer processor 921 to which the hop count report packet 150 is input from the signal line L2 outputs the hop count report packet 150 to the signal line L8-$i$ corresponding to the line interface 910-$i$ so as to transmit the input hop count report packet 150 from the line interface 910-$i$ corresponding to receiving line interface information written to an L2 payload 220 of the input hop count report packet 150.

The adjacent slave node 120 that receives the probe packet 140 and other plural slave nodes 120 execute the same processing.

Figure 12:
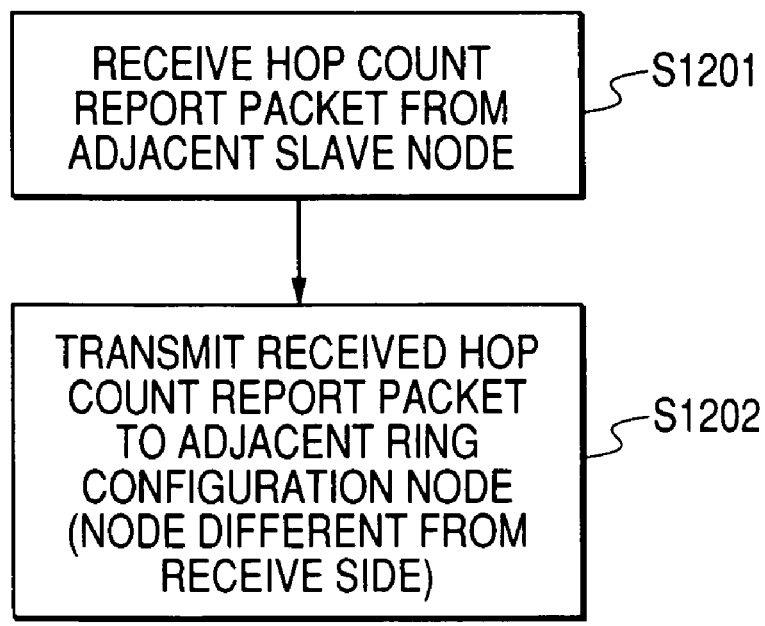
FIG. 12 is a flowchart showing a process for transferring the hop count report packet 150 by the slave node 120.

FIG. 12 is a flowchart showing a process for transferring a hop count report packet 150 by a slave node 120.

First, the slave node 120 receives the hop count report packet 150 (a step S1201). The slave node applied no update to information written to the received hop count report packet 150. The slave node 120 transmits the hop count report packet 150 toward an adjacent node via a port accommodating a line for the ring on the reverse side to a packet received port so as to transmit it to the master switch 110 after receiving the hop count report packet 150 (a step S1202).

In-node operation in the above-mentioned steps will be described below. In a slave switch 120-$b$ (b=1 to M, b≠a) that receives the hop count report packet 150 from the adjacent slave switch 120-$a$ (a=1 to M), when a line interface 910-$c$ (c=1 to N) receives the hop count report packet 150 transmitted from the adjacent slave switch 120-$a$, the slave switch outputs the received hop count report packet 150 to a signal line L8-$c$. Its packet transfer processor 921 to which the hop count report packet 150 is input from the signal line L8-$c$ identifies that the received packet is a hop count report packet 150 based upon information written to the received packet. At this time, the packet transfer processor 921 outputs the hop count report packet 150 to a signal line L8-$d$ (d=1 to N, d≠c) corresponding to a port accommodating a line for the ring different from a receiving line interface that receives the hop count report packet 150 so as to transmit the received hop count report packet 150 via the port accommodating the line for the ring different from the receiving line interface that receives the hop count report packet 150. Afterward, the hop count report packet 150 is transmitted via a line interface 910-$d$ corresponding to the signal line L8-$d$.

Figure 5:
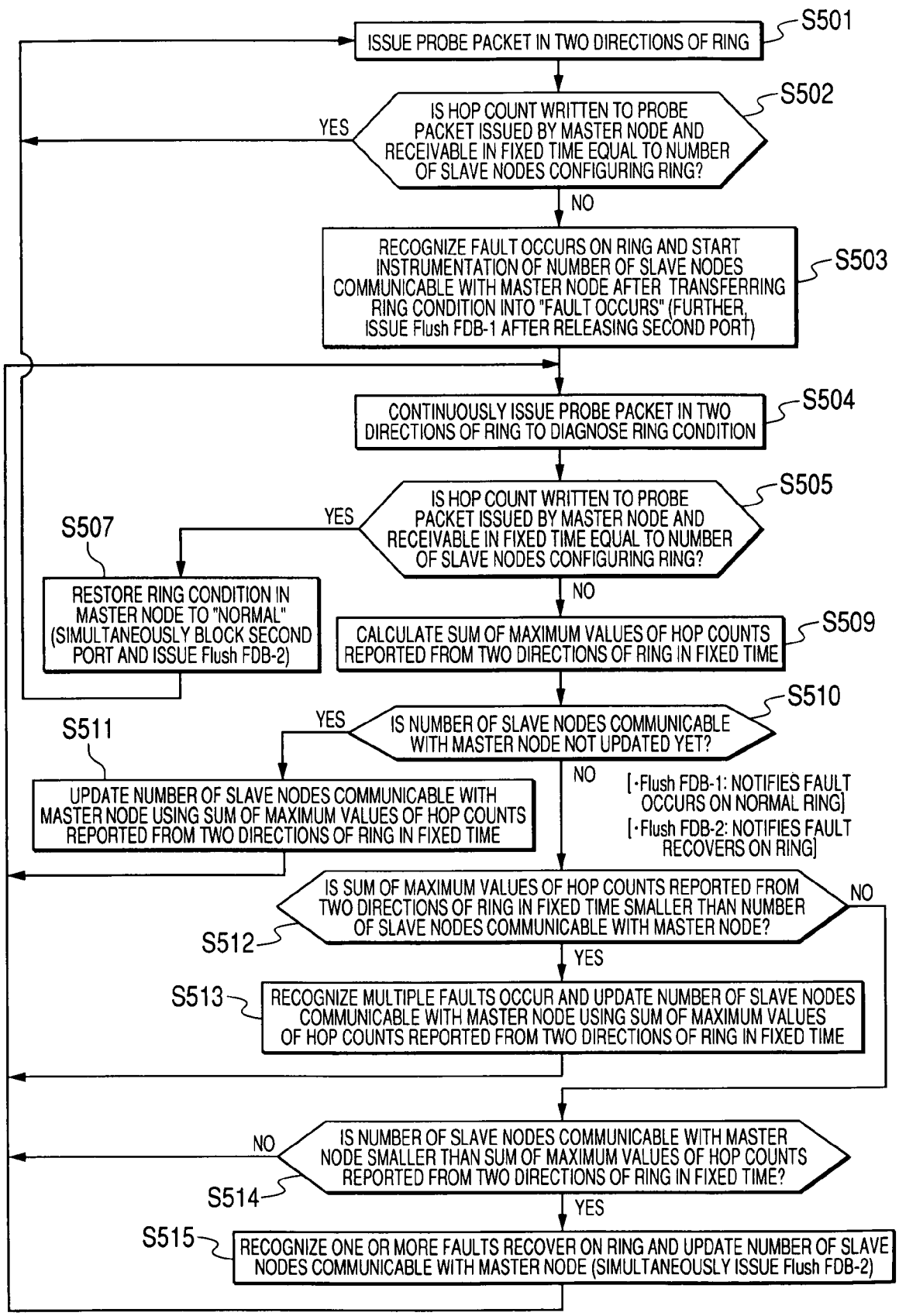
FIG. 5 is a flowchart showing the operation for coping with a fault by the master node 110.

FIG. 5 is a flowchart showing the operation for dealing with a fault by the master node 110. A process for dealing with the fault by the master node 110 will be described using a flow of the process shown in FIG. 5 below. Referring to FIGS. 7, 9 and 10, a process at each node will be described in detail below.

First, the master node 110 issues a probe packet 140 on a two-way ring line accommodated in itself as described above (a step S501). The master node 110 can receive the probe packet 140 which is issued by itself and a hop count of which is incremented by each slave node 120, making a round on the ring in fixed time and checks whether the hop count written to the received probe packet 140 is equal to the number of slave nodes 120 with which the ring is provided or not (a step S502). The number of the slave nodes 120 with which the ring is provided is set in a suitable memory beforehand. In the step S502, either of whether the probe packet 140 can be received or not or whether the hop count is equal to the number of slave nodes 120 or not may also be judged. When "Yes" is selected in the step S502, the process is returned to the step S501 and in the meantime, when "No" is selected, the process proceeds to a step S503.

To explain the step S502 in detail, in the master node 110, first, the line interface 910-$i$ outputs the received probe packet 140 to the signal line L8-$i$. The packet transfer processor 921 to which the probe packet 140 is input from the signal line L8-$i$ identifies that the input packet is a probe packet 140 based upon information written to the input packet and outputs it to the signal line L1. The ring packet input unit 931 to which the probe packet 140 is input from the signal line L1 identifies that the input packet is a probe packet 140 and outputs it to the signal line L91. In the master node 110, the probe packet manager 932 to which the probe packet 140 is input from the signal line L91 does not increment the hop count of the input probe packet 140 unlike the slave node 120 but outputs the input probe packet 140 to a signal line L93. The ring condition manager 933 to which the probe packet 140 is input from the signal line L93 checks whether or not timing at which the probe packet 140 is input is within effective time set beforehand of a ring protocol management timer. The ring condition manager 933 simultaneously or substantially simultaneously compares the hop count written to the L2 payload 220 of the probe packet 140 and the number of slave nodes with which the ring is provided and which is defined in mode setting. When the probe packet 140 is input within the effective time set beforehand of the ring protocol management timer and the hop count written to the L2 payload 220 of the probe packet 140 is equal to the number of slave nodes with which the ring is provided and which is defined in mode setting, the ring condition manager 933 outputs an instruction to generate a new probe packet 140 to the ring protocol control packet generator 934 via the signal line L96. The handling of the probe packet 140 generated in the ring protocol control packet generator 934 is described above.

When a condition of the step S502 is met, the master node 110 executes the step S501. In the meantime, when the condition is not met in the step S502, the master node 110 interprets that a fault occurs on the ring and transfers a ring condition in the ring condition manager 933 into "fault occurs". Afterward, the logical block of the second port 1102 that logically blocks a data packet is released.

In the step S503, the master node 110 issues a first message (Flush FDB-1) for requesting the update of the database for transfer after or immediately after the logical block of the second port 1102 is released (the step S503). The Flush FDB-1 is issued to request the update of the database for transfer when a fault occurs. Further, the master node 110 starts the instrumentation of the number of slave nodes communicable with the master node 110. For example, the number of slave nodes communicable with the master node 110 shall be '0'.

The step S503 will be described in detail below. The ring condition manager 933 judges that a fault (a first fault) occurs on the ring when the probe packet 140 is not input within the effective time set beforehand of the ring protocol management timer (the step S502) or when a hop count written to the L2 payload 220 of the input probe packet 140 is not equal to the number defined in mode setting of slave nodes with which the ring is provided (the step S502). At this time, the ring condition manger transfers a ring condition to be managed into "fault occurs". The ring condition manager 933 simultaneously or substantially simultaneously starts the instrumentation of the number of slave nodes communicable with the master node 110. For example, in this case, the number of slave nodes communicable with the master node 110 shall be '0'. The ring condition manager 933 notifies the ring protocol control packet generator 934 that the fault occurs on the ring after the instrumentation or immediately after it. The ring protocol control packet generator 934 outputs a fault occurrence notification packet to a signal line L4 via the ring packet output unit 935 to notify the device controller 940 that the fault occurs on the ring.

The device controller 940 to which the fault occurrence notification packet is input from the signal line L4 outputs the input fault occurrence notification packet to a signal line L6 and the signal line L7. A fault occurrence notice and the input time of the fault occurrence notification packet are displayed on a display for example of the administrative terminal 30 to which the fault occurrence notification packet is input from the signal line L7.

The packet transfer processor 921 to which the fault occurrence notification packet is input from the signal line L6 releases the logical block defined in mode setting of the second port 1102. The packet transfer processor 921 outputs an instruction to delete information for packet transfer written to the packet transfer database 922 to the signal line L10 after or immediately after the logical block of the second port 1102 is released. Besides, the packet transfer processor 921 outputs a transfer database update packet (Flush FDB-1) to a signal line L8-$e$ (e=1 to N) and a signal line L8-$f$ (f=1 to N, e≠f) corresponding to the first port 1101 and the second port 1102 so as to transmit the transfer database update packet from the first port 1101 and the second port 1102 respectively defined in mode setting. The transfer database update packet can use a format of the packet 200. When the transfer database update packet is generated, the packet transfer processor 921 writes information for identifying the occurrence of a fault on the ring and the transfer database update packet to an L2 payload 220.

In the master node 110, the packet transfer database 922 stores no information for transferring a data packet as a result of deleting the information for packet transfer according to the instruction from the packet transfer processor 921. At this time, even if the packet transfer processor 921 inputs a data packet, no destination of the input data packet is shown as a result of retrieval in the packet transfer database 922. The packet transfer processor 921 outputs the input data packet to the signal lines L8-1 to L8-N so as to transmit the input data packet via all the accommodated line interfaces 910. This operation is called flooding.

As a result of flooding, when the transmitted data packet reaches a destination, the destination of the data packet transmits a message to notify of the reception of the data packet to the node that executes flooding. The node that executes flooding and receives the data packet reception verification message relates the destination of the transmitted data packet and the line interface 910-$i$ that receives the data packet reception verification message. This is called address learning. In the master node 110, the packet transfer database 922 is updated by the repetition of flooding and address learning.

The packet transfer processor 921 of the slave node 120 that receives Flush FDB-1 from its adjacent node identifies that the Flush FDB-1 is a transfer database update packet based upon information written to the received packet. Afterward, the packet transfer processor 921 outputs an instruction to delete information for packet transfer written to the packet transfer database 922 to the signal line L10. The operation related to the update of the packet transfer database 922 of the slave node 120 is the same as that of the master node 110. At the same time or after it, the packet transfer processor 921 outputs the transfer database update packet to the signal line L8-$m$ corresponding to the port accommodating the line for the ring different from packet received line interface information so as to transmit the transfer database update packet from the port accommodating the line for the ring different from the received line interface information written to an L2 payload 220 of the transfer database update packet.

Next, in a step S504, the master node 110 continues to issue the probe packet 140 independent of whether a fault occurs or not (the step S504). Besides, the master node 110 can receive the probe packet 140 which is issued by itself and a hop count of which is incremented by the slave nodes 120 in fixed time as in the step S502 and checks whether or not the hop count written to the received probe packet 140 is equal to the number defined in mode setting of slave nodes 120 with which the ring is provided (a step S505).

When a condition in the step S505 is met (Yes in the step S505), the master node 110 recognizes that no fault occurs on the ring. At this time, the master node 110 restores a ring condition to be managed to "normal". In addition, the master node 110 logically blocks the second port 1102 and issues a message (Flush FDB-2) to prompt the update of the transfer database (a step S507). The Flush FDB-2 is issued to prompt the update of the transfer database when a fault recovers.

The steps S504 and S505, the step S507 and a packet handling process in the ring related to these steps will be described in detail below. The ring condition manager 933 of the master node 110 also continues to diagnose a ring condition after recognizing that a fault occurs on the ring to be managed. Then, the ring condition manager 933 outputs a signal to prompt the generation of a probe packet 140 to the signal line L96 so as to instruct the ring protocol control packet generator 934 to generate the probe packet 140. The handling of the generated probe packet 140 in the master node 110 is described above. Further, the ring condition manager 933 resets the ring protocol management timer at the same as or substantially at the same as the signal to prompt the generation of the probe packet 140 is output.

After transmitting the probe packet 140, when the step S505 having the same condition as the step S502 is not met, the ring condition manager 933 recognizes that a fault continues on the ring. In the meantime, when the step S505 is met, the ring condition manager 933 recognizes that all the faults on the ring recover and restores a ring condition to "normal". Afterward, the ring condition manager 933 notifies the ring protocol control packet generator 934 of the recovery of the faults on the ring. Further, the ring condition manager 933 also continues to diagnose a ring condition after the recognizing that the faults on the ring to be managed recover. Then, the ring condition manager 933 outputs a signal to prompt the generation of a probe packet 140 to the signal line L96 so as to instruct the ring protocol control packet generator 934 to generate the probe packet 140 as after recognizing that a fault occurs. The ring protocol control packet generator 934 outputs a fault recovery notification packet to the signal line L4 so as to notify the device controller 940 of the recovery of the faults on the ring.

The device controller 940 to which the fault recovery notification packet is input from the signal line L4 outputs the input fault recovery notification packet to the signal lines L6 and L7. The fault recovery notice and time at which the fault recovery notification packet is input are displayed on a display for example of the administrative terminal 30 to which the fault recovery notification packet is input from the signal line L7.

The packet transfer processor 921 to which the fault recovery notification packet is input from the signal line L6 logically blocks the second port 1102 defined in mode setting. After or immediately after the second port 1102 is logically blocked, the packet transfer processor 921 outputs an instruction to delete information for packet transfer written to the packet transfer database 922 to the signal line L10. Besides, the packet transfer processor 921 outputs a transfer database update packet to the signal lines L8-e and L8-f corresponding to the first port 1101 and the second port 1102 so as to transmit the transfer database update packet from the first port 1101 and the second port 1102 respectively defined in mode setting as when a fault occurs. The transfer database update packet uses a format of the packet 200. When the transfer database update packet is generated, the packet transfer processor 921 writes information for identifying the occurrence of a fault on the ring and the transfer database update packet to the L2 payload 220 of the transfer database update packet. A procedure for updating each transfer database in the node appliances 900 with which the ring is provided is described above.

In the meantime, when the condition in the step S505 is not met, that is, when a fault on the ring continues (No in the step S505), the master node 110 calculates the sum of maximum hop counts reported (received) from the two directions (the first port 1101 and the second port 1102) of the ring in fixed time (a step S509). The master node 110 manages a maximum value of the hop count included in a hop count report packet 150 received from each port every port. The master node 110 checks whether or not "the number of slave nodes communicable with the master node 110" the instrumentation of which is started in the step S503 is updated (a step S510). In this case, when "the number of slave nodes communicable with the master node 110" is not updated yet or when "the number of slave nodes communicable with the master node 110" is '0', the master node 110 substitutes "the sum of the maximum hop counts reported from the two directions of the ring in fixed time" acquired in the step S509 for "the number of slave nodes communicable with the master node 110" (updates "the number of slave nodes communicable with the master node 110")(a step S511). The process is returned to the step S504.

The steps S509 to S511 will be described in detail below. First, the operation when the hop count report packet 150 is received of the master node 110 will be described. In the master node 110, when line interfaces 910-e and 910-f accommodating the first port 1101 and the second port 1102 receive the hop count report packet 150, they output the hop count report packet to the corresponding signal line L8-e or L8-f. The packet transfer processor 921 to which the hop count report packet 150 received from the signal line L8-e or L8-f is input identifies that the input packet is a hop count report packet 150 based upon information written to the input packet. At this time, packet received line interface information written to an L2 payload 220 in the input hop count report packet 150 is updated (in this case, the packet received line interfaces 910-e and 910-f are used for information to be updated). Afterward, the packet transfer processor 921 outputs the input hop count report packet 150 to the signal line L1. The ring packet input unit 931 to which the hop count report packet 150 is input from the signal line L1 identifies that the input packet is a hop count report packet 150 and outputs it to the signal line L92. In the master node 110, the ring condition manager 933 to which the hop count report packet 150 is input from the signal line L92 checks whether the time-limit of the ring protocol management timer is effective or not. When the time-limit of the ring protocol management timer is effective, the ring condition manager 933 records the packet received line interface information and a hop count respectively written to the L2 payload 220. If packet received line interface information written to a succeeding hop count report packet 150 is the same as the packet received line interface information recorded in the ring condition manager 933 in the hop count report packet 150 when the ring condition manager 933 receives the succeeding hop count report packet 150 within the effective time of the ring protocol management timer, a value of a hop count corresponding to the received line interface is updated so that the value is a hop count value (or a larger value) written to the succeeding hop count report packet 150.

The ring condition manager 933 adds up a value of a hop count corresponding to the packet received line interface 910-e and a value of a hop count corresponding to the packet received line interface 910-f when the time-limit of the ring protocol management timer is gone. That is, the sum of maximum values of the hop counts received via the received line interfaces 910-e and 910-f is acquired.

Afterward, the ring condition manager 933 checks a value of "the number of slave nodes communicable with the master node 110" set to '0' when the fault occurs. When the value remains '0' (unupdated), the ring condition manager 933 updates "the number of slave nodes communicable with the master node 110" using "the sum of maximum hop counts reported from the two directions of the ring in fixed time" acquired in the step S509. After the update, the ring condition manger 933 in the master node 110 triggers to execute the step S504. The step S504 and succeeding steps are executed by the trigger.

In the step 510, when a value of "the number of slave nodes communicable with the master node 110" is not '0' (when a value of "the number of slave nodes communicable with the master node 110" is already updated), the ring condition manager 933 in the master node 110 checks whether or not "the sum of the maximum hop counts reported from the two directions of the ring in fixed time" acquired in the step S509 is smaller than "the number of the slave nodes communicable with the master node 110" (a step S512). When "the sum of the maximum hop counts reported from the two directions of the ring in fixed time" is smaller than "the number of the slave nodes communicable with the master node 110" (the step S512), the ring condition manager 933 in the master node 110 recognizes that multiple faults occur on the ring. At this time, the ring condition manager 933 in the master node 110 updates "the number of slave nodes communicable with the master node 110" using "the sum of the maximum hop counts reported from the two directions of the ring in fixed time" (a step S513). After updating "the number of slave nodes communicable with the master node 110", the ring condition manager 933 in the master node 110 triggers to execute the step S504.

In the step S512, when "the sum of the maximum hop counts reported from the two directions of the ring in fixed time" acquired in the step S509 is not smaller than "the number of slave nodes communicable with the master node 110" (the step S512), the ring condition manager 933 in the master node 110 checks whether or not "the number of slave nodes communicable with the master node 110" is smaller than "the sum of the maximum hop counts reported from the two directions of the ring in fixed time" (a step S514). When "the number of slave nodes communicable with the master node 110" is equal to "the sum of the maximum hop counts reported from the two directions of the ring in fixed time" (No in the step S514), the ring condition manager 933 in the master node 110 triggers to execute the step S504. In the meantime, when "the number of slave nodes communicable with the master node 110" is smaller than "the sum of the maximum hop counts reported from the two directions of the ring in fixed time" (Yes in the step S514), the ring condition manager 933 recognizes that one or more faults on the ring recover. At this time, "the number of slave nodes communicable with the master node 110" is updated using "the sum of the maximum hop counts reported from the two directions of the ring in fixed time" and Flush FDB-2 is issued (a step S515). However, as no fault on the ring recovers, the ring condition manager 933 makes "fault occurs" remain without transferring a ring condition to be managed and triggers to execute the step S504. As described above, the steps S504 to S515 are repeated until all the faults on the ring recover.

An example of locations where faults occur on the single ring network 100 shown in FIG. 1 will be described below. For example, when a hop count report packet 150 cannot be received via the first port 1101 of the master node 110, an estimated location of a fault may be the line interface of the master node 110, the line interface of the slave node 120-1 and the inside of the slave node 120-1. For a fault inside the slave node, there are a case that a probe packet 140 and a hop count report packet 150 cannot be transferred because of a fault of the packet transfer unit and a case that a hop count report packet 150 cannot be generated because of a fault of the ring manager for example.

When a hop count report packet 150 can be received via the first port 1101 of the master node 110, it can be estimated based upon a hop count written to the hop count report packet 150 about at which node a fault occurs. For example, when the hop count written to the hop count report packet 150 is '1', a location that can be estimated of a fault may be the line interface for transmitting a probe packet 140 to the slave node 120-2 of the slave node 120-1, the line interface of the slave node 120-2 and the inside of the slave node 120-2. Only the location of a fault via the first port 1101 is described above, however, a location of a fault via the second port 1102 is also similar.

Figure 15:
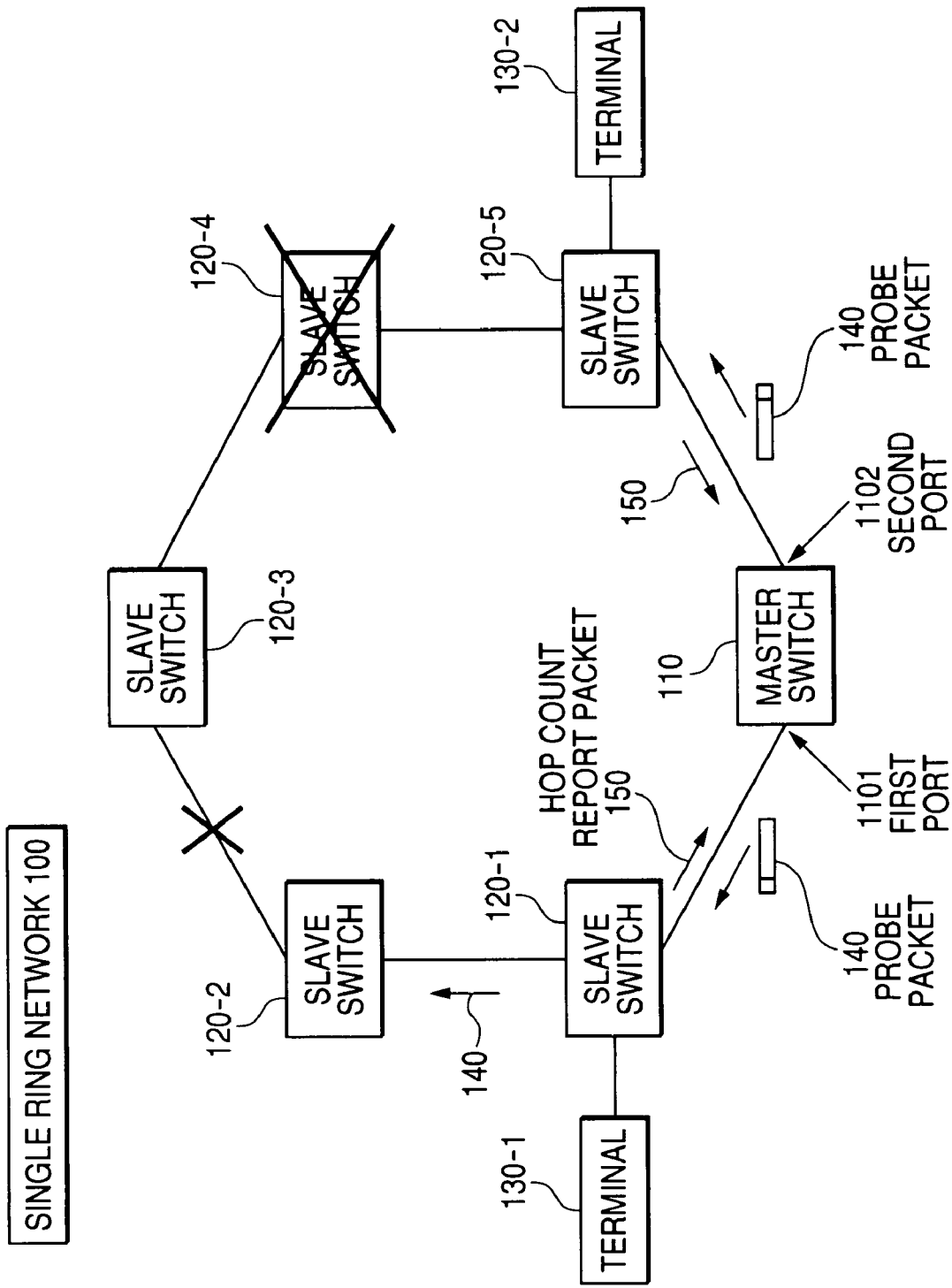
FIG. 15 is an explanatory drawing showing an example of multiple faults.

Relation between the occurrence of plural faults (multiple faults) on the ring and the sum of hop counts will be described using an example below (for example, see FIG. 15). For example, on the ring network shown in FIG. 1, when a fault (a first fault) occurs on/in a signal line or the line interface between the slave switch 120-2 and the slave switch 120-3, the master node 110 receives a hop count report packet 150 having a hop count of '2' via the first port 1101 and receives a hop count report packet 150 having a hop count of '3' via the second port 1102 (the sum is 5). Further, when a fault (a second fault) occurs inside the slave switch 120-4, the master node 110 receives a hop count report packet 150 having a hop count of '2' via the first port 1101 and receives a hop count report packet 150 having a hop count of '1' via the second port 1102 (the sum decreases up to 3). Hereby, the master node 110 recognizes that multiple faults occur on the ring.

Next, when the fault on the signal line between the slave switch 120-2 and the slave switch 120-3 recovers, the master node 110 receives a hop count report packet 150 having a hop count of '3' via the first port 1101 and receives a hop count report packet 150 having a hop count of '1' via the second port 1102 (the sum increases to 4). The master node 110 recognizes that at least one fault recovers. When the master node 110 recognizes the occurrence and the recovery of faults, it outputs a transfer database update packet (Flush FDB-1 or Flush FDB-2) to suitably update the database for transfer to nodes configuring the ring.

In this example, the occurrence of the multiple faults of the fault on the signal line or in the line interface and the fault inside the slave switch is described. However, also in the case of multiple faults on the signal lines or multiple faults inside the slave switches, the sum of hop counts similarly increases or decreases.

Second Embodiment

Figure 14:
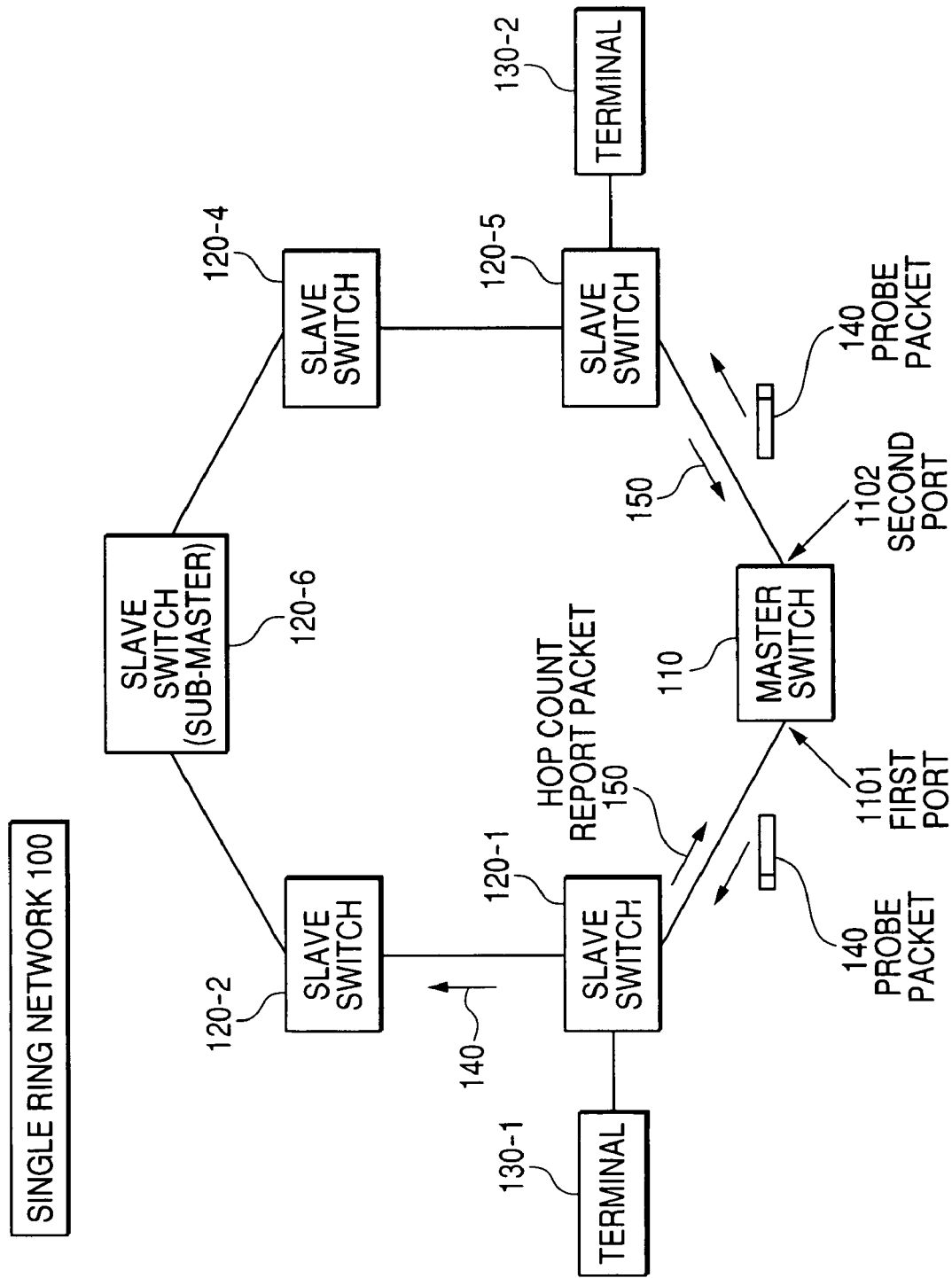
FIG. 14 is a block diagram showing a ring network equivalent to a second embodiment.

FIG. 14 shows the configuration of a ring network equivalent to a second embodiment.

In the second embodiment, a case that a fault occurs in the master node 110 shown in FIG. 1 or a case that a probe packet 140 from the master node 110 cannot be received because of multiple faults will be described. The configuration of the network is the same as that in the first embodiment. However, in this embodiment, one of slave nodes 120 is defined as a sub-master node 120-6.

The sub-master node 120-6 transfers its own condition into "master" when a fault occurs in the master node 110 and plays the similar role to the master node 110. The sub-master node 120-6 in a condition of "master" is restored to the original condition (a condition of "sub-master") when the proper master node 110 recovers from the fault. When no fault occurs in the master node 110, the sub-master node 120-6 executes the same operation as other slave nodes.

Figure 6:
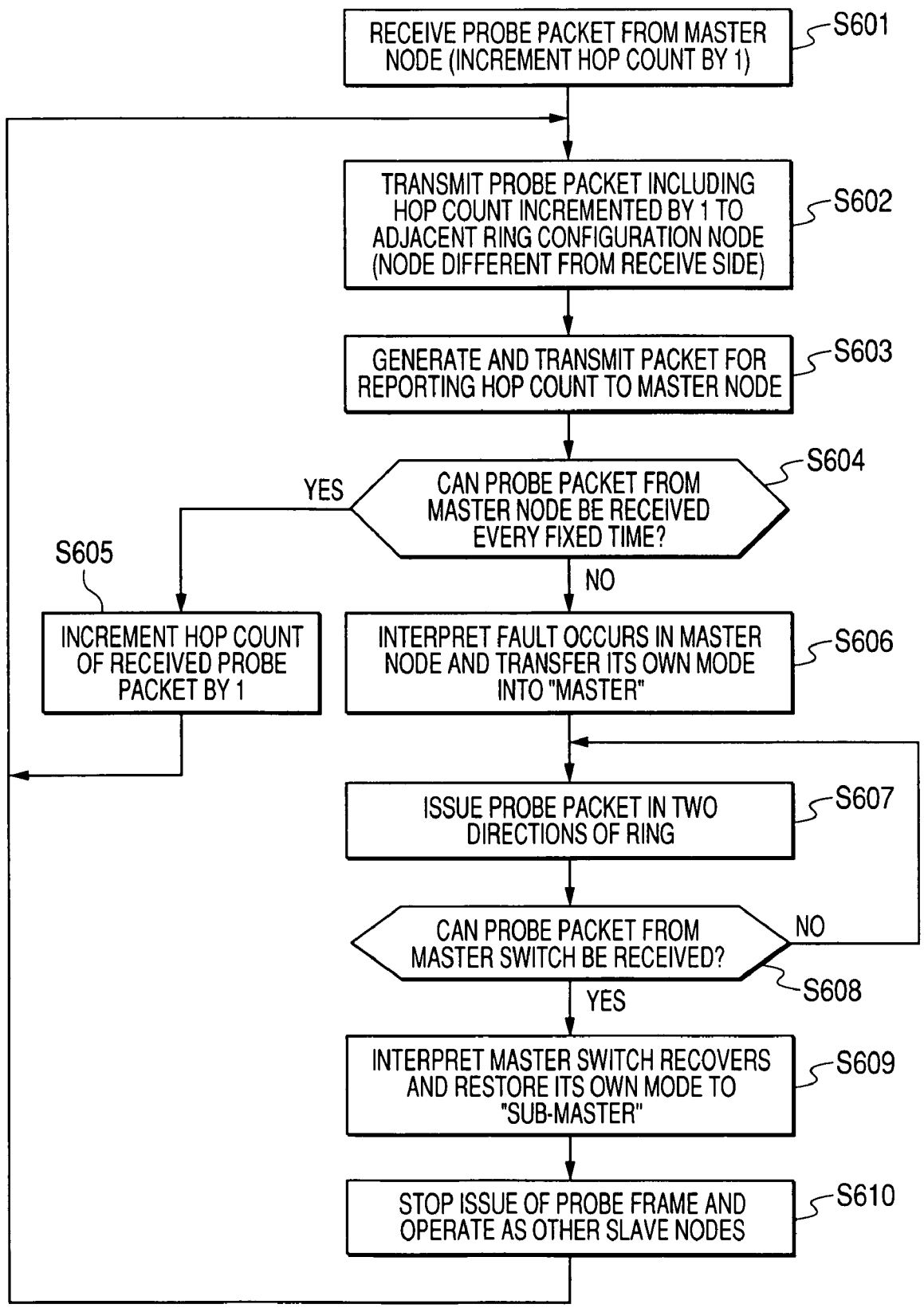
FIG. 6 is a flowchart showing the operation of a sub-master node.

FIG. 6 is a flowchart showing the operation of the sub-master node 120-6 when a fault occurs in the master node 110.

When the ring is normal, the sub-master node 120-6 operates as a slave node. The sub-master node 120-6 receives a probe packet 140 transmitted from the master node 110 (a step S601) and increments a hop count in the probe packet 140 by 1 for example. The sub-master node 120-6 transmits the probe packet 140 to an adjacent node from a port accommodating a line for the ring on the reverse side to a port that receives the probe packet 140 transmitted from the master node 110 after incrementing the hop count (a step S602). The sub-master node 120-6 generates a hop count report packet 150 simultaneously or before/after it and transmits the generated hop count report packet 150 to the master node 110 (a step S603). After the sub-master node 120-6 transmits the hop count report packet 150 to the master node 110, it checks whether a probe packet 140 from the master node 110 can be received every fixed time or not (a step S604). When a probe packet 140 can be received every fixed time (the step S604), the sub-master node 120-6 increments a hop count of the probe packet 140 transmitted from the master node 110 by 1 (a step S605) and executes the step S602.

The details of the steps S601 to S603 in this embodiment which are already described in the first embodiment are omitted. Matters related to the step S601 and the step S604 will be described below. In the sub-master node 120-6, a sub-master mode is set in mode setting which a network manager instructs an administrative terminal 30 to perform. At this time, a ring condition manager 933 in the sub-master mode does not activate a ring protocol management timer and keeps it standby. When the ring condition manager 933 receives the probe packet 140 transmitted from the master node 110 in the step S601, it activates the ring protocol management timer. When a ring packet input unit 931 in the sub-master node 120-6 receives the probe packet 140 transmitted from the master node 110 in fixed time after the ring protocol management timer is activated, the ring packet input unit identifies that the input packet is a probe packet 140 and outputs it to a signal line L91. A probe packet manager 932 to which the probe packet 140 transmitted from the master node 110 is input from the signal line L91 makes three copies of the probe packet 140 transmitted from the master node 110 slightly unlike a case that the sub-master node is set as a slave node 120. The probe packet manager 932 outputs the probe packet 140 which is transmitted from the master node 110 and the three copies of which are made to a signal line L93, a signal line L94 and a signal line L95 (the handling of the probe packet 140 transmitted from the master node 110 and output to the signal line L94 and the signal line L95 is omitted because the handling is already described in relation to the transmission/the reception of the probe packet 140 by the slave node 120). A ring condition manager 933 to which the probe packet 140 transmitted from the master node 110 is input from the signal line L93 checks whether or not the input of the probe packet 140 is within effective time set beforehand of the ring protocol management timer. When the probe packet 140 transmitted from the master node 110 is input within the effective time set beforehand of the ring protocol management timer, the ring condition manager 933 resets the ring protocol management timer.

In the meantime, when the sub-master node 120-6 cannot receive the probe packet 140 transmitted from the master node 110 in fixed time (the step S604), the sub-master node judges that a fault occurs in the master node 110 and transfers its own mode into "master" (a step S606). In the step S606, the ring condition manager 933 recognizes that the fault occurs in the master node 110 when the probe packet 140 transmitted from the master node 110 is not input from the signal line L93 within the effective time after the ring protocol management timer is activated, and transfers its own mode into "master". As for a case that the probe packet 140 cannot be received from the master node 110, there are a fault by the master node 110 itself, a case that the probe packet 140 cannot be received because a fault respectively occurs on two paths connecting the sub-master node 120-6 and the master node 110, and others. A fault in the master node 110 will be described below.

The sub-master node 120-6 transferred into "master" issues a probe packet 140 to the two-way ring network which the sub-master node itself accommodates every fixed time to cope with multiple faults (a step S607). The details of the operation of the sub-master node in the master mode are similar to those of the master node 110 in the first embodiment and therefore, the detailed description is omitted.

The sub-master node 120-6 in the master mode checks whether a probe packet 140 transmitted from the master node 110 is received or not (a step S608). In this case, a ring manager 930 monitors whether a probe packet 140 transmitted from the master node 110 can be received or not. The sub-master node 120-6 executes the step S607 when the ring manager 930 cannot receive a probe packet 140 transmitted from the master node 110.

The sub-master node 120-6 interprets that the master node 110 recovers when a probe packet 140 transmitted from the master node 110 can be received and restores its own mode to "sub-master" (a step S609). At this time, the sub-master node 120-6 stops the issue of a probe packet 140 by itself and operates like other slave nodes 120 (a step S610).

The steps S609 and S610 will be described in detail below. When the ring packet input unit 931 recognizes that the input packet is a probe packet 140 transmitted from the master node 110, it outputs the probe packet to the signal line L91. The probe packet manager 932 to which the probe packet 140 transmitted from the master node 110 is input from the signal line L91 makes three copies of the probe packet 140 transmitted from the master node 110 as described above. The probe packet manager 932 outputs the three copies acquired as a result of copying of the probe packet 140 transmitted from the master node 110 to the signal line L93, the signal line L94 and the signal line L95. The transfer of the probe packet 140 and the generation of a hop count report packet 150 to be transmitted to the master node 110 based upon the probe packet 140 transmitted from the master node 110 and output to the signal line L94 and the signal line L95 are executed. The ring condition manager 933 to which the probe packet 140 transmitted from the master node 110 is input from the signal line L93 judges that the fault in the master node 110 recovers and restores its own mode to "sub-master". The ring condition manager 933 that restores its own mode to "sub-master" stops the issue of the probe packet 140 transmitted by the sub-master node 120-6 and simultaneously or substantially simultaneously makes itself unconscious of information written to a hop count report packet 150 transmitted from another slave node 120 (makes processing as the master node unexecuted).

In the second embodiment, the slave node 120-6 is defined as the sub-master node, however, the similar effect to that in the second embodiment is acquired by defining any or more of the slave nodes 120-i as the sub-master node.

Third Embodiment

In a third embodiment, operation for coping with the recovery of multiple faults of a master node 110 on a ring including the sub-master node 120-6 in the second embodiment will be described. However, in this embodiment, only the difference from the first embodiment and the second embodiment will be described. The configuration of a network is similar to that in the second embodiment.

Figure 8:
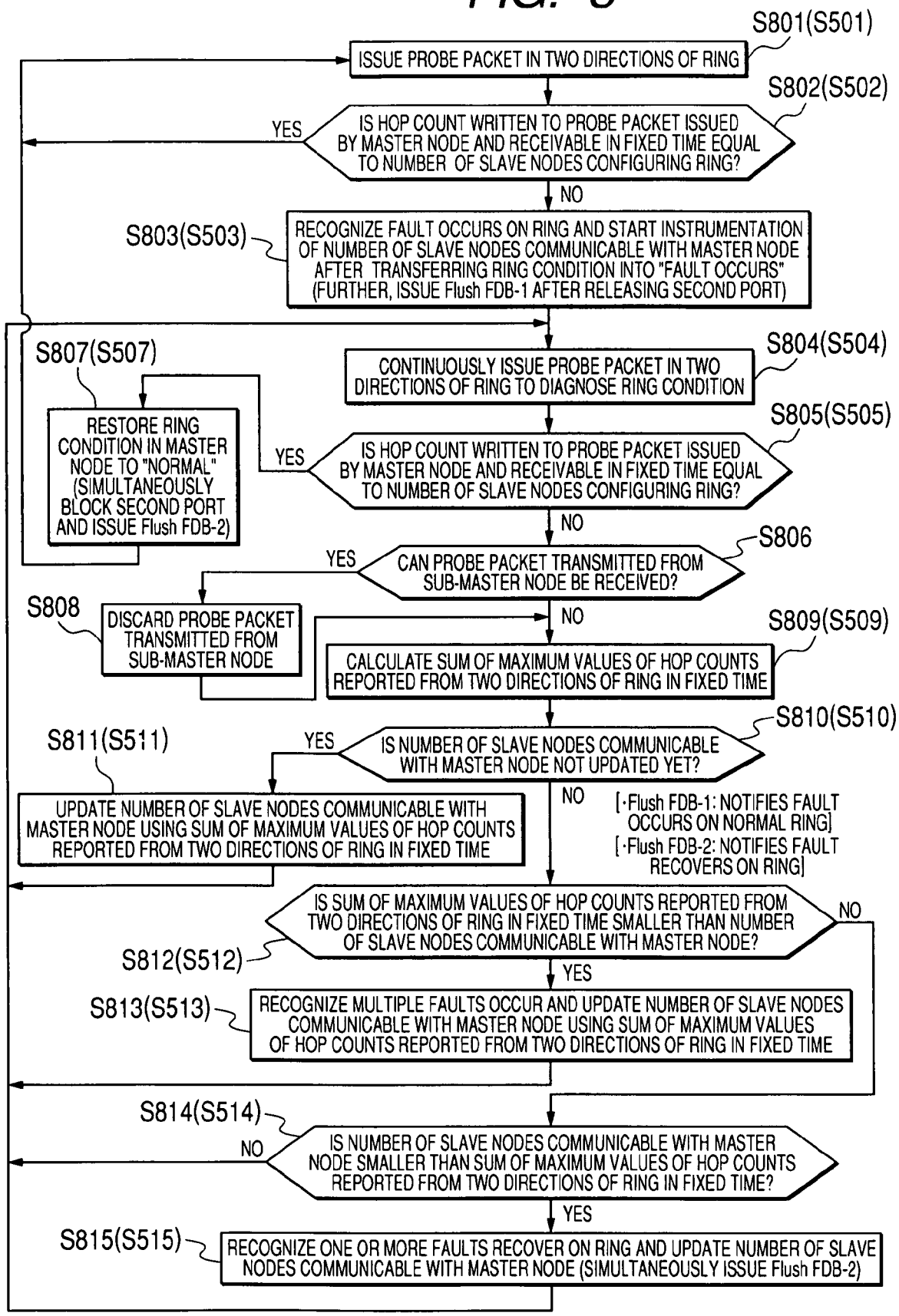
FIG. 8 is a flowchart showing the operation for coping with a fault by the master node 110 including the sub-master node.
Figure 13:
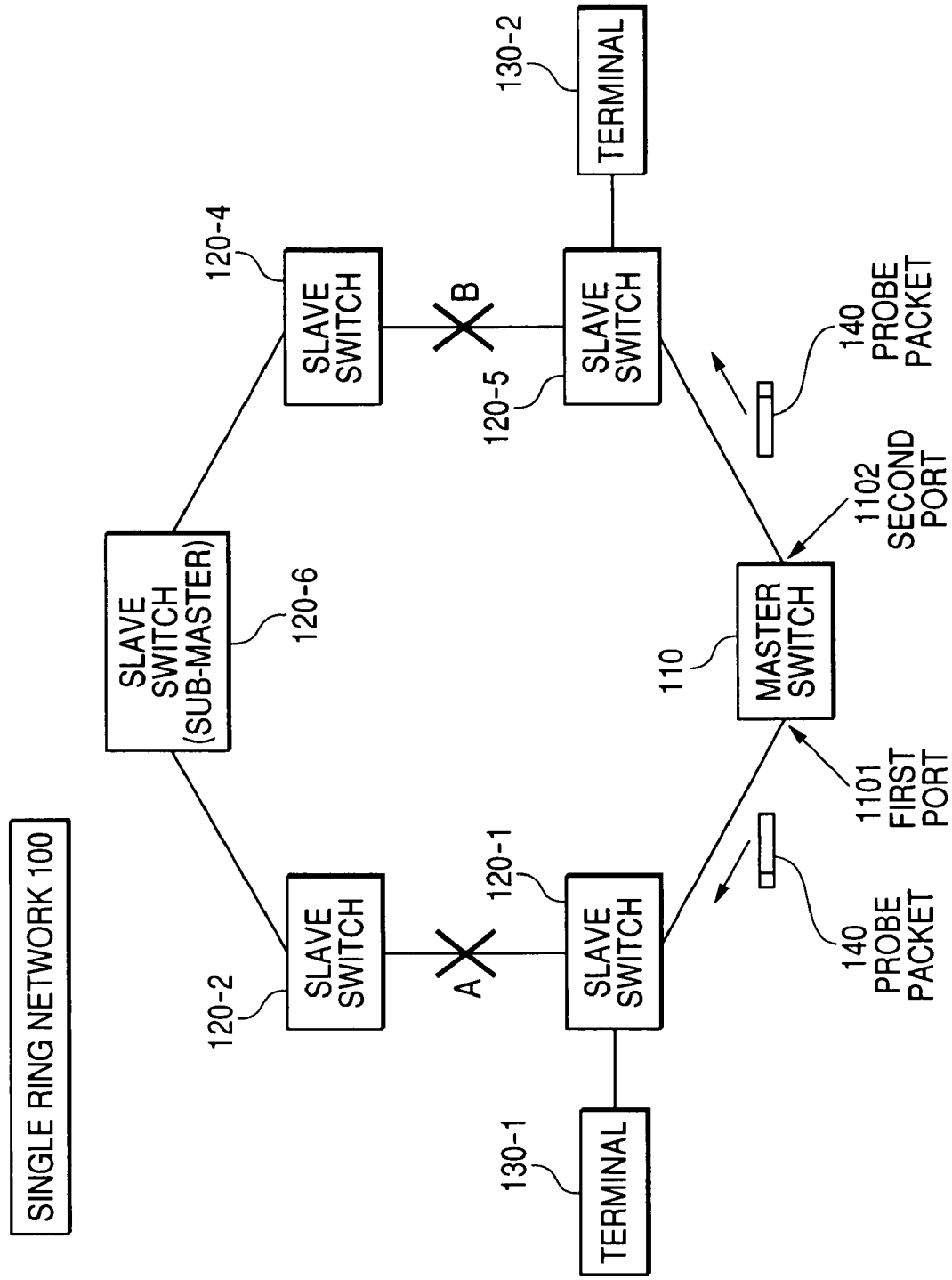
FIG. 13 is a block diagram showing the single ring network 100 on which multiple faults occur.

FIG. 13 shows the configuration of a ring network 100 where multiple faults occur. FIG. 8 is a flowchart showing the operation by the master node 110 for coping with the faults on the ring including the sub-master node 120-6. The same reference numeral is allocated to the similar step to the above-mentioned step and its detailed description is omitted.

Referring to FIG. 13, the operation of the master node 110 when the faults recover will be described below. In an example shown in FIG. 13, multiple faults occur between slave nodes 120-1 and 120-2 (a fault A) and between slave nodes 120-4 and 120-5 (a fault B). The sub-master node 120-6 shown in FIG. 13 is supposed to be already in operation in a master mode and have issued a probe packet 140.

When a condition in a step S805 (the step S505) shown in FIG. 8 is not met, the master node 110 checks whether a probe packet 140 transmitted from the sub-master node 120-6 is received or not (a step S806). In this case, a ring manager 930 of the master node 110 monitors whether the probe packet 140 transmitted from the sub-master node 120-6 can be received or not for recovery from the multiple faults. The master node 110 executes a step S809 (the step S509) when the ring manager 930 cannot receive the probe packet 140 transmitted from the sub-master node 120-6.

In the step S806, the master node 110 discards the received probe packet 140 transmitted from the sub-master node 120-6 when a part of the multiple faults (for example, the fault B) recovers and the probe packet 140 transmitted from the sub-master node 120-6 can be received (a step S808). Afterward, the master node executes the step S809 (the step 509).

To explain the step S808 in detail, the master node 110 does not transfer a received probe packet 140 when the master node receives the probe packet 140 transmitted from a node different from itself unlike the sub-master node 120-6 in the second embodiment. The master node does not issue a hop count report packet 150 to the sub-master node 120-6 that issues the received probe packet 140. The reason why the master node does not execute these operation is to avoid confusion on the ring.

As described above, according to this embodiment, independent of whether a fault occurs in the master node 110 or not, the occurrence of multiple faults on the ring and the recovery of a part from the multiple faults can be detected.

Fourth Embodiment

For a further example, a case that topology varies with the sum of hop counts unchanged while multiple faults occur on the ring network shown in FIG. 1 will be described below. In this case, topology means the configuration of the network for example. For example, as shown in FIG. 15, when the first fault and the second fault occur as multiple faults, the sum of hop counts in a master node 110 is '3'.

Figure 16:
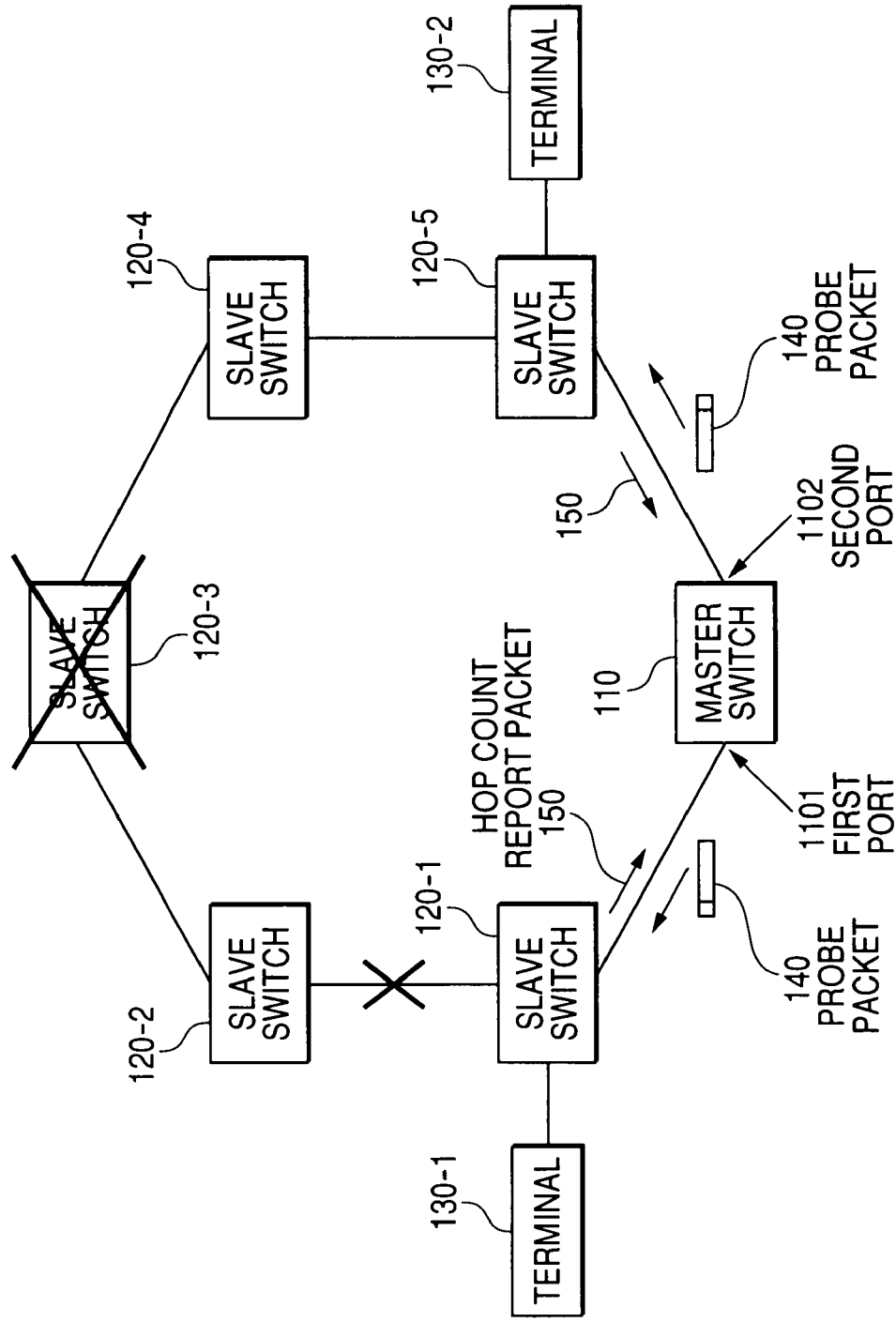
FIG. 16 is an explanatory drawing showing the change of topology in a fourth embodiment.

FIG. 16 is an explanatory drawing showing the change of topology in this embodiment.

In this case, when a fault occurs on a signal line between slave switches 120-1 and 120-2 or in a line interface and a fault occurs inside a slave switch 120-3 (FIG. 16) as the same time as the above-mentioned faults all recover, the sum of hop counts in the master node 110 remains 3. In this embodiment, in addition to the processes in the above-mentioned embodiments, further, the master node 110 recognizes that maximum values of hop counts received in each direction of the ring vary, judges that topology varies, and issues a transfer database update packet (Flush FDB-2). Hereby, in a case that locations where faults occur vary with the sum of hop counts unchanged, the faults can be detected and a transfer database can be updated.

The master node 110 manages, for every port, the maximum values of hop counts included in hop count report packets 150 received via each port as in the above-mentioned embodiments. The master node may also manage the maximum values of the hop counts every port and every probe packet. For example, a probe packet and a hop count report packet corresponding to it may also include an identifier for identifying the probe packet and maximum values of hop counts may also be managed corresponding to the identifier every port. Incidentally, the master node 110 judges that topology does not vary when a situation that the sum of hop counts is unchanged continues and maximum values of the hop counts received in each direction of the ring are unchanged and issues no transfer database update packet (Flush FDB-2). The change of topology is not limited to the above-mentioned example.

Next, a process in this embodiment will be described. Hardware configuration, the transmission and the transfer of a probe packet are similar to those in the first embodiment.

Figure 17:
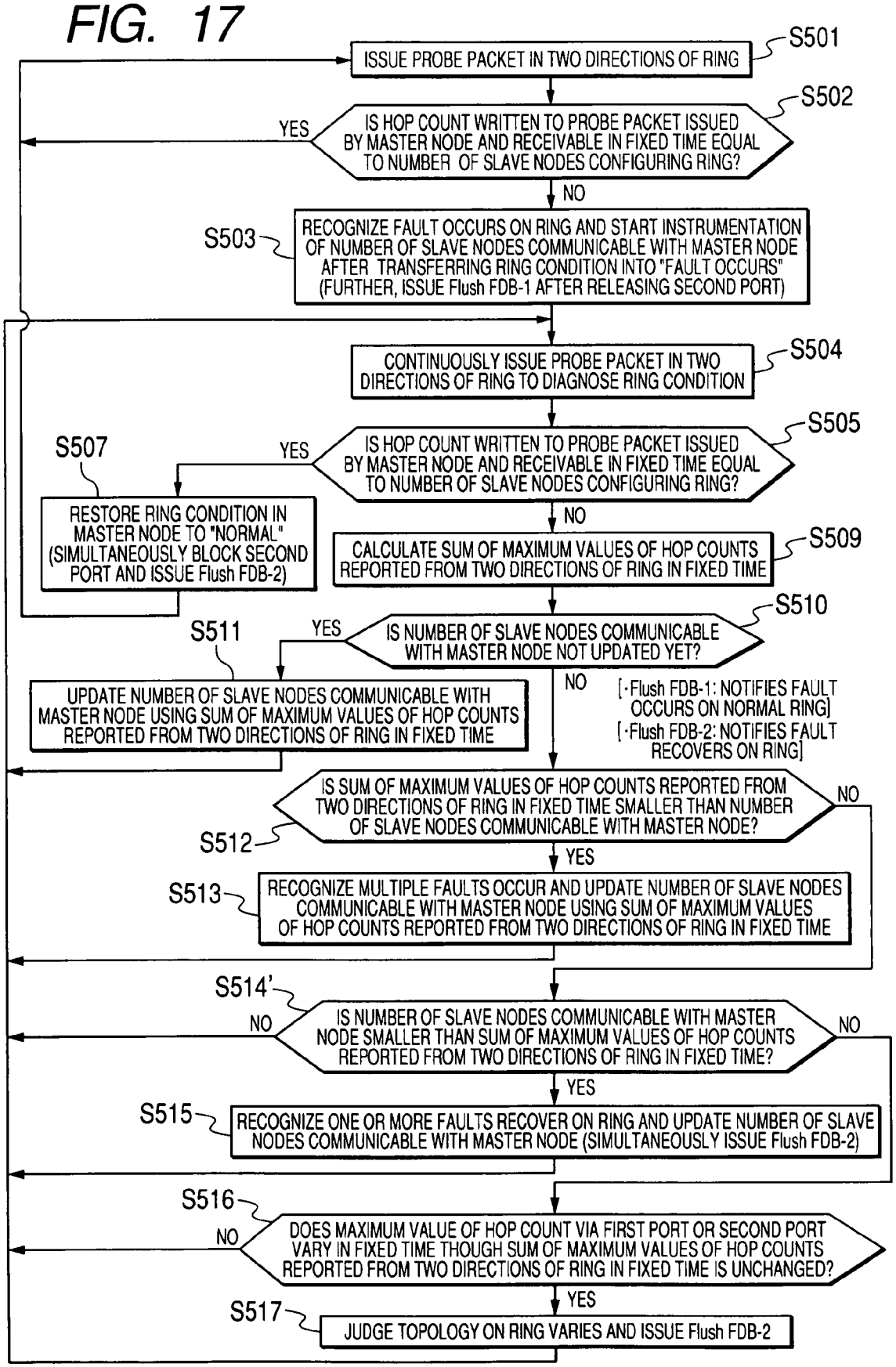
FIG. 17 is a flowchart showing the operation for coping with a fault by a master node 110 in the fourth embodiment.

FIG. 17 is a flowchart showing the operation for coping with a fault by the master node 110 in this embodiment. As each processing in the steps S501 to S513 is similar to that in the first embodiment, the description is omitted.

In the step S512, a ring condition manager 933 in the master node 110 checks whether "the number of slave nodes communicable with the master node 110" is smaller than "the sum of maximum hop counts reported from two directions of the ring in fixed time" or not (a step S514') when "the sum of the maximum hop counts reported from the two directions of the ring in fixed time" acquired in the step S509 is not smaller than "the number of the slave nodes communicable with the master node 110" (the step S512).

When "the number of slave nodes communicable with the master node 110" is smaller than "the sum of maximum hop counts reported from two directions of the ring in fixed time" (Yes in the step S514'), the ring condition manager 933 recognizes that one or more faults on the ring recover. At this time, "the number of the slave nodes communicable with the master node 110" is updated using "the sum of the maximum hop counts reported from the two directions of the ring in fixed time" and Flush FDB-2 is issued (the step S515). However, as all the faults on the ring do not cover, the ring condition manager 933 keeps a ring condition to be managed "fault occurs" without transferring the ring condition to be managed and triggers to execute the step S504.

In the meantime, when "the number of slave nodes communicable with the master node 110" is not smaller than "the sum of maximum hop counts reported from two directions of the ring in fixed time" (No in the step S514), the ring condition manager 933 in the master node 110 judges that "the number of the slave nodes communicable with the master node 110" is equal to "the sum of the maximum hop counts reported from the two directions of the ring in fixed time" based upon the results of the steps S513 and S514. At this time, the ring condition manager 933 checks whether a maximum value of a hop count in each port varies in fixed time (or for every probe packet) or not using "a maximum value of a hop count included in a hop count report packet 150 received from each port" managed for every port as described above (the step S516).

For example, a maximum value (a first value) of a hop count every port in the last time is stored in another area at suitable timing such as before a probe packet is issued and afterward, the maximum value of the hop count is reset. Besides, for example, in the step S509, the reset maximum value of the hop count is sequentially updated according to a received hop count report packet and a maximum value (a second value) of a hop count in the corresponding time is acquired. In the step S516, the maximum value (the second value) of the hop count in the corresponding time and the maximum value (the first value) of the hop count in the last time are compared for every port and it is judged whether the maximum value varies or not.

When maximum values of hop counts are managed for every port and every probe packet, the maximum values of the hop counts for two probe packets may also be compared. For example, values for continuous two probe packets may also be compared.

When "a maximum value of a hop count in each port of the master node 110" does not vary in fixed time (No in the step S516), the ring condition manager 933 triggers to execute the step S504. In the meantime, when "the maximum value of the hop count in each port of the master node 110" varies in fixed time (Yes in the step S516), the ring condition manager 933 judges that topology on the ring to be managed varies and issues Flush FDB-2 (the step S517). However, since all the faults on the ring do not recover, the ring condition manager 933 keeps a ring condition to be managed "fault occurs" without transferring the ring condition and triggers to execute the step S504. As described above, the steps S504 to S517 are repeated until all the faults on the ring recover.

Fifth Embodiment

The steps (for example, S516, S517) for coping with the change of topology in the fourth embodiment can also be applied to the second and third embodiments. Hardware configuration, the transmission and the transfer of a probe packet are similar to those in the second and third embodiments.

Figure 18:
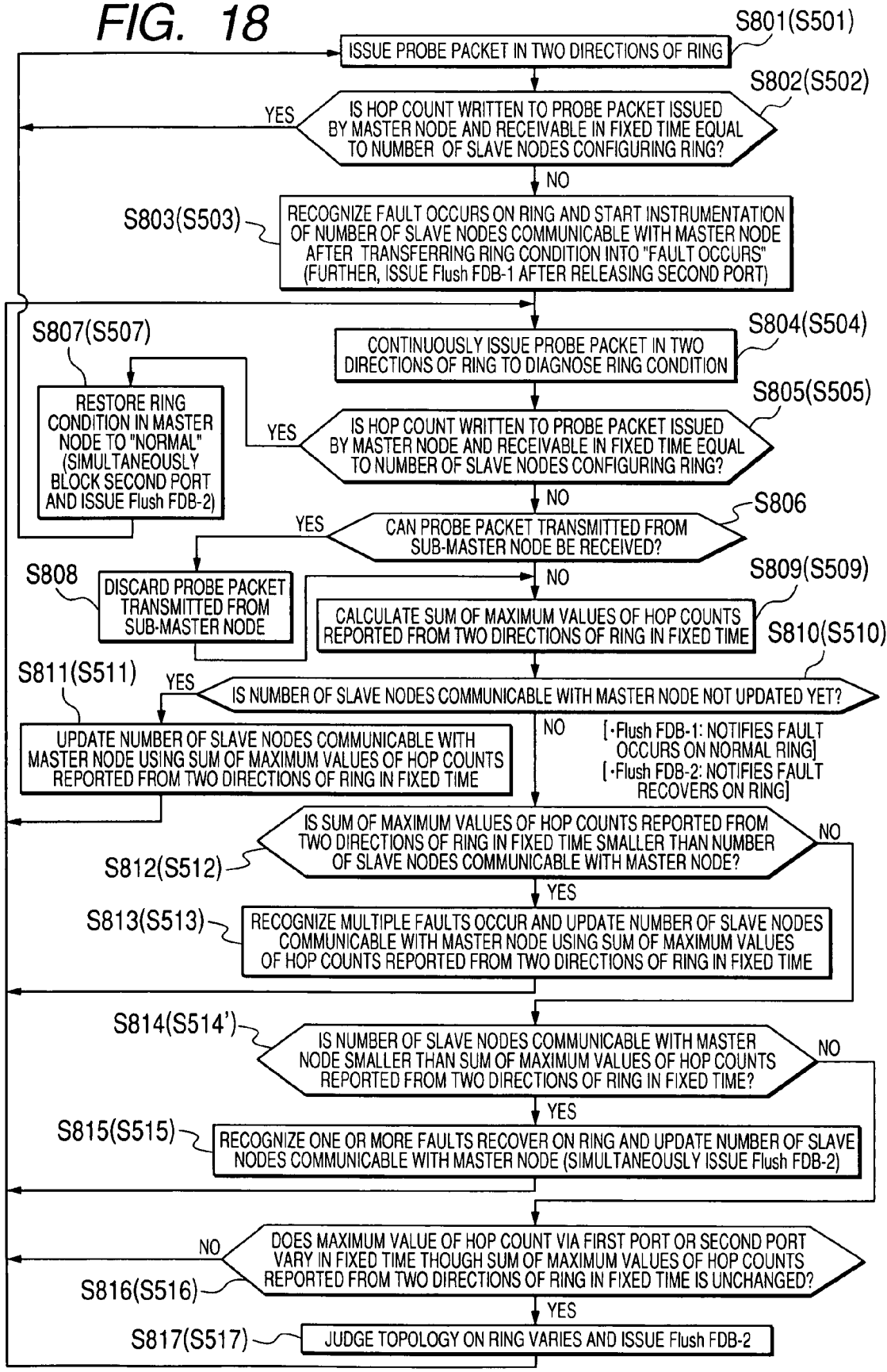
FIG. 18 is a flowchart showing the operation for coping with a fault on a ring by a master node 110 including a sub-master node in a fifth embodiment.

FIG. 18 is a flowchart showing the operation for coping with a fault on a ring by a master node 110 including a sub-master node in this embodiment. As the details of each step are similar to those in the third and fourth embodiments, the same reference numeral is allocated and the description is omitted.

The invention can be applied to a group of nodes having master-slave relationship on the ring.

What is claimed is:

1. A ring network, comprising:
a plurality of nodes that transfer a packet referring to a database for packet transfer,
wherein the plurality of nodes are connected in a ring;
at least one of the nodes is a master node that transmits a probe packet for checking a condition of the network where the plurality of nodes are connected in the ring and the other nodes are slave nodes that process according to an instruction from the master node;
the master node transmits one or a predetermined number of probe packets of which each hop count is initialized in both directions of the ring via a first port and a second port every predetermined time or irregularly;
each of the slave nodes increments a hop count included in the probe packet when each of the slave nodes receives the probe packet via one of two ports connected to the ring;
each of the slave nodes transmits the probe packet including the incremented hop count to the adjacent slave node or the master node via the other port different from the port via which the probe packet is received;
each of the slave nodes generates a hop count report packet including the incremented hop count and transmits it to the master node via the port via which the probe packet is received;
the master node receives a plurality of hop count report packets from each of the slave nodes via the first port and the second port and manages a maximum value of hop counts included in the hop count report packets for every port;
the master node calculates the sum of a maximum value of hop counts corresponding to the first port and a maximum value of hop counts corresponding to the second port and acquires the total number of slave nodes communicable with the master node based upon the calculated sum;
the master node detects the occurrence of multiple faults on the ring and the recovery of at least one of the multiple faults based upon the variation of the acquired total number of communicable slave nodes; and
the master node updates a database in itself every time the master node detects these events and/or transmits a packet for updating the database for packet transfer to the slave node.

2. The ring network according to claim 1,
wherein the master node further detects the change of topology in the ring based upon the variation of a maximum value of hop counts corresponding to the first port or the second port when the acquired total number of communicable slave nodes is unchanged; and
the master node further updates the database in itself every time the master node detects the change and/or transmits a packet for updating the database for packet transfer to the slave node.

3. The ring network according to claim 1,
wherein the master node detects a first fault on the ring based upon a fact that a probe packet transmitted via the first port is not received via the second port and/or a fact that a probe packet transmitted via the second port is not received via the first port; and
the master node detects the occurrence of a second fault and the recovery of at least one of the first and second faults based upon the variation of the total number of communicable slave node after the first fault is detected.

4. The ring network according to claim 1, wherein the master node blocks the transmission/reception of a data packet via either of the first or the second port accommodating a line for the ring when the ring has no fault and is normal;

the master node permits the transmission/reception of a data packet via the first and second ports when one or a plurality of faults occur on the ring; and the master node blocks the transmission/reception of a data packet via either of the first or the second port when all faults on the ring recover.

5. The ring network according to claim 1, wherein while a fault occurs on the ring, the master node detects the occurrence of multiple faults based upon a fact that the total number of slave nodes decreases, compared with their previous total number.

6. The ring network according to claim 1, wherein while multiple faults occur on the ring, the master node detects the recovery of at least one of the multiple faults based upon a fact that the total number of slave nodes increases, compared with their previous total number.

7. The ring network according to claim 2, wherein while multiple faults occur on the ring, the master node detects a change of topology or a change of locations where the multiple faults occur based upon the variation of a maximum value of hop counts corresponding to the first or the second port when the total number of slave nodes is unchanged, compared with their previous total number.

8. The ring network according to claim 1, wherein the slave node deletes information stored in the database when the slave node receives a packet for updating the database from the master node and executes address learning.

9. The ring network according to claim 1, wherein at least one of the slave nodes is a sub-master node that operates as either of a master node or a slave node according to a set mode;

the sub-master node sets a mode to a sub-master mode when the sub-master node can receive one or more probe packets from the master node in a predetermined time and operates as a slave node; and the sub-master node sets the mode to a master mode when the sub-master node cannot receive one or more probe packets from the master node in the predetermined time and operates as a master node.

10. The ring network according to claim 9, wherein the sub-master node set to the master mode transmits a packet for updating the database for packet transfer to the slave node and/or the master node respectively configuring the ring when the sub-master node receives a probe packet from the master node because at least one of faults recovers and restores the mode to a sub-master mode.

11. The ring network according to claim 9, wherein the master node discards the following probe packet when the master node receives the probe packet from the sub-master node.

12. The ring network according to claim 9, wherein:

a probe packet transmitted from the master node and/or the sub-master node includes an identifier showing a sender of the probe packet.

13. A master node in a ring network where a plurality of nodes that transfer a packet referring to a database for packet transfer are connected in a ring, comprising:

a first port and a second port respectively connected to the ring; and a ring manager that detects the occurrence and the recovery of a fault on the ring, wherein the ring manager transmits one or a predetermined number of probe packets of which each hop count is initialized in both directions of the ring via the first port and the second port every predetermined time or irregularly;

the ring manager receives, via the first port and the second port, a plurality of hop count report packets acquired because each of the other nodes configuring the ring receives a probe packet transmitted by the ring manager or transferred by another node via one of the two ports connected to the ring, increments a hop count included in the probe packet, transfers the probe packet including the incremented hop count to an adjacent node via the other port different from the packet received port, generates a hop count report packet including the incremented hop count and transmits the probe packet via the received port;

the ring manager manages a maximum value of hop counts included in the hop count report packets for every port;

the ring manager calculates the sum of a maximum value of hop counts corresponding to the first port and a maximum value of hop counts corresponding to the second port and acquires the total number of communicable nodes based upon the calculated sum;

the ring manager detects the occurrence of multiple faults on the ring and the recovery of at least one of the multiple faults based upon the variation of the acquired total number of the communicable nodes; and the ring manager updates a database in the master node every time these events are detected and/or transmits a packet for updating the database for packet transfer to the other nodes configuring the ring.

14. The master node according to claim 13, wherein the ring manager further detects a change of topology in the ring based upon the variation of a maximum value of hop counts corresponding to the first port or the second port when the acquired total number of communicable slave nodes is unchanged; and the ring manager further updates the database in the master node every time the change is detected and/or transmits a packet for updating the database for packet transfer to the other nodes.

* * * * *